US008885583B2

(12) United States Patent
Yamada et al.

(10) Patent No.: US 8,885,583 B2
(45) Date of Patent: *Nov. 11, 2014

(54) CONDITIONAL UPLINK TIMING ALIGNMENT IN A MOBILE STATION DEVICE OF A RADIO COMMUNICATION SYSTEM

(75) Inventors: Shohei Yamada, Osaka (JP); Yasuyuki Kato, Osaka (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/291,840

(22) Filed: Nov. 8, 2011

(65) Prior Publication Data

US 2012/0057531 A1 Mar. 8, 2012

Related U.S. Application Data

(62) Division of application No. 12/529,160, filed as application No. PCT/JP2008/064217 on Aug. 7, 2008, now abandoned.

(30) Foreign Application Priority Data

Aug. 8, 2007 (JP) ................. P2007-207213

(51) Int. Cl.
    *H04W 4/00* (2009.01)
    *H04J 3/06* (2006.01)
    *H04L 7/00* (2006.01)
    *H04W 56/00* (2009.01)
    *H04W 74/00* (2009.01)
    *H04W 74/08* (2009.01)

(52) U.S. Cl.
    CPC ........ *H04W 56/0015* (2013.01); *H04W 56/005* (2013.01); *H04W 74/008* (2013.01); *H04W 74/0833* (2013.01)
    USPC ........... 370/329; 370/350; 370/509; 375/358; 455/502

(58) Field of Classification Search
    CPC ............ H04W 56/001; H04W 56/005; H04W 56/0015; H04W 56/0045; H04W 74/006; H04W 74/008; H04W 74/0833

USPC ......... 370/252, 310, 324, 328–332, 341, 350, 370/395.62, 431, 436, 437, 443, 503, 370/507–514; 455/450–452.1, 436–444, 455/550.1, 556.2, 561, 418, 423–425, 434, 455/502, 507, 510, 517; 375/130, 135, 136, 375/142–152, 240.28, 343, 357–365

See application file for complete search history.

(56) References Cited

U.S. PATENT DOCUMENTS 6,657,988 B2 * 12/2003 Toskala et al. ................ 370/350
7,873,005 B2     1/2011 Ahn et al.

(Continued)

FOREIGN PATENT DOCUMENTS

CN      1383632      12/2002
CN      1497882       5/2004

(Continued)

OTHER PUBLICATIONS

Motorola, "Random Access Procedure and Message Contents", Jun. 2006.*

(Continued)

*Primary Examiner* — Habte Mered
(74) *Attorney, Agent, or Firm* — Slater & Matsil, L.L.P.

(57) ABSTRACT

A mobile station device transmits a random access preamble, whose preamble ID is randomly selected by the mobile station device, to a base station device and performs uplink timing alignment based on the synchronization timing deviation information included in a random access response which the base station device transmits in response to the transmitted random access preamble. In an uplink synchronous status, upon receiving the random access response including timing deviation information, the mobile station device ignores the timing deviation information. Otherwise, the mobile station device performs the uplink timing alignment based on the timing deviation information.

8 Claims, 10 Drawing Sheets

(56) References Cited

U.S. PATENT DOCUMENTS

| | | | |
|---|---|---|---|
| 8,009,663 | B2 | 8/2011 | Yamada et al. |
| 2006/0166688 | A1 | 7/2006 | Sun et al. |
| 2007/0206531 | A1 | 9/2007 | Pajukoski et al. |
| 2007/0274278 | A1 | 11/2007 | Choi et al. |
| 2008/0273610 | A1 | 11/2008 | Malladi et al. |
| 2008/0310396 | A1* | 12/2008 | Park et al. ............. 370/350 |
| 2009/0111445 | A1 | 4/2009 | Ratasuk et al. |
| 2009/0201891 | A1 | 8/2009 | Lee et al. |
| 2009/0203323 | A1 | 8/2009 | Ratasuk et al. |
| 2009/0232107 | A1* | 9/2009 | Park et al. ............. 370/336 |
| 2009/0300457 | A1* | 12/2009 | Kuo ..................... 714/749 |
| 2009/0316630 | A1 | 12/2009 | Yamada et al. |
| 2009/0316666 | A1 | 12/2009 | Yamada et al. |
| 2009/0323607 | A1 | 12/2009 | Park et al. |
| 2010/0020786 | A1 | 1/2010 | Futaki et al. |
| 2010/0034158 | A1 | 2/2010 | Meylan |
| 2010/0088580 | A1 | 4/2010 | Chun et al. |
| 2010/0098050 | A1 | 4/2010 | Yamada et al. |
| 2010/0111067 | A1 | 5/2010 | Wu |
| 2010/0118777 | A1 | 5/2010 | Yamada et al. |
| 2010/0165943 | A1 | 7/2010 | Kato et al. |
| 2010/0182992 | A1* | 7/2010 | Chun et al. ............. 370/350 |
| 2010/0246562 | A1 | 9/2010 | Yamada et al. |
| 2010/0254356 | A1* | 10/2010 | Tynderfeldt et al. .......... 370/336 |
| 2010/0284376 | A1 | 11/2010 | Park et al. |
| 2010/0290407 | A1 | 11/2010 | Uemura |
| 2011/0002262 | A1 | 1/2011 | Wang et al. |

FOREIGN PATENT DOCUMENTS

| | | |
|---|---|---|
| CN | 1681353 | 10/2005 |
| CN | 1757184 | 4/2006 |
| CN | 101686538 | 12/2012 |
| CN | 101686537 | 7/2013 |
| EP | 0981257 | 2/2000 |
| EP | 2101538 | 9/2009 |
| EP | 2101538 A2 | 9/2009 |
| WO | 2004077919 | 9/2004 |
| WO | WO 2004/077919 A2 | 9/2004 |
| WO | 2008156305 A1 | 6/2008 |

OTHER PUBLICATIONS

3GPP TR 25.814, 3rd Generation Partnership Project; Technical Specification Group Radio Access Network; Physical layer aspects for evolved Universal Terrestrial Radio Access (UTRA) (Release 7), pp. 1-132.

3GPP TS (Technical Specification) 36.211, V1.10(May 2007), Technical Specification Group Radio Access Network, Physical Channel and Modulation (Release 8), pp. 1-34.

3GPP TS (Technical Specification) 36.212, V1.20(May 2007), Technical Specification Group Radio Access Network, Multiplexing and channel coding (Release 8), pp. 1-15.

Ericsson, "Initial, Random Access and Identity Handling", TSG-RAN WG2 Meeting #51 Tdoc R2-060592, 3GPP, Feb. 13-17, 2006, pp. 1-7.

ETSI TS 136 300, V8.1.0 (Jun. 2007), "Universal Mobile Telecommunications System (UMTS) . . . ", pp. 1-108.

Extended European Search Report in European Application No. 09011153.5 mailed Jan. 10, 2011.

Extended European Search Report in European Application No. 09011153.5 mailed Sep. 21, 2010.

Extended European Search Report in European Application No. 11006472.2 mailed Oct. 6, 2011.

IPWirelesss, "RACH access procedure(s) in E-UTRAN", 3GPP TSG-RAN WG2 #57, Feb. 16, 2007, R2-070645, pp. 1-3.

LG Electronics, "LTE Random Access Use Cases", 3GPP TSG RAN WG2 Meeting #52 R2-060890, 3GPP, Feb. 13-17, 2006, pp. 1-5.

LG Electronics: "Discussion on Timing Advance Maintenance," 3GPP TSG-RAN WG2 #58 bis, Jun. 25-29, 2007, Orlando, USA, R2-072738, pp. 1-4.

LG Electronics: "Uplink resource request for uplink scheduling," 3GPP TSG RAN WG1 #44 bis, R1-060922, pp. 1-4.

Nokia Siemens Networks, "Update on Mobility, Security, Random Access Procedure, etc", 3GPP TSG-RAN WG2 Meeting #58, R2-072338, Kobe, Japan, May 7-11, 2007.

NTT DoCoMo, Inc. rapporteur, "Summary of email discussion point 3: Initial access procedure: C-RNTI and HARQ", 3GPP TSG-RAN WG2 #56bis, Jan. 15-19, 2007, R2-070263, pp. 1-9.

NTT DoCoMo, Inc., "Text proposal on random access procedures", 3GPP TSG RAN WG2 #57bis, Draft R2-071562, 3GPP, Mar. 26-30, 2007, p. 1-4, St. Julian's, Malta.

NTT DoCoMo, Inc., "Uplink Synchronization", 3GPP TSG RAN WG2 #52 R2-063401, 3GPP, Nov. 6-10, 2006, pp. 1-3.

Search Report issued Feb. 1, 2010 in Eurasian Patent Application No. 200901107.

Search Report issued Jan. 28, 2010 in Eurasian Patent Application No. 200970753.

Sharp, "RA-RNTI vs. C-RNTI for non-contention based random access", 3GPP TSG-RAN WG2 #58bis, Jun. 29, 2007, R2-072379, 1 page.

European Search Report dated Sep. 14, 2010 for Application No. 10006357.7.

European Search Report dated Sep. 17, 2010 for Application No. 08826898.2.

European Search Report dated Sep. 17, 2010 for Application No. 09011154.3.

European Search Report dated Sep. 9, 2010 for Application No. 09011152.7.

3GPP, "Technical Specification Group Radio Access Network; Evolved Universal Terrestrial Radio Access (E-UTRA) and Evolved Universal Terrestrial Radio Access Network (E-UTRA); Overall description; Stage 2 (Release 8)", 3GPP TS 36.300, V8.0.0, Mar. 2007, 82 pages provided.

Ericsson, "Addressing of RA Response for RA with dedicated preambles", 3GPP TSG-RAN WG2 #58bis, Tdoc R2-072562, Jun. 25-29, 2007, 2 pages provided.

ETRI, "Considerations on L1/L2 control signaling", 3GPP TSG RAN WG2 #57bis, R2-071320, Mar. 26-30, 2007, 3 pages provided.

U.S. Advisory Action issued in U.S. Appl. No. 12/551,051 on Feb. 11, 2013.

U.S. Office Action issued in U.S. Appl. No. 12/817,433 on Mar. 15, 2013.

U.S. Advisory Action issued in U.S. Appl. No. 12/817,433 on Dec. 31, 2012.

U.S. Final Office Action issued in U.S. Appl. No. 12/551,051 on Nov. 16, 2012.

U.S. Final Office Action issued in U.S. Appl. No. 12/817,433 on Oct. 17, 2012.

Huawei Technologies Co. Ltd., European Office Action in Application No. 08 826 898.2-1854, dated Sep. 2, 2013, 7 pages.

Texas Instruments, R1-071477, 3GPP TSG RAN WG1#48 bis, "Transmission of Uplink Timing Advance Command in E-UTRA", Agenda Item: 7.7, Document for: Discussion and Decision, St. Julian, Malta, Mar. 26-30, 2007, 4 pages.

Motorola, R2-061991, 3GPP TSG RAN WG2 AH, "Random Access Procedure and Message Contents", Agenda Item: 7, Document for: Discussion and Decision, Cannes, France, Jun. 27-30, 2006, 4 pages.

ETSI TS 136 300 V8.1.0, Technical Specification, Universal Mobile Telecommunications System (UMTS); Evolved Universal Terrestrial Radio Access (E-UTRA); and Evolved Universal Terrestrial Radio Access (E-UTRAN); Overall description; Stage 2 (3GPP TS 36.300 version 8.1.0 Release 8), Jun. 2007, 108 pages.

LG Electronics, R2-072738, 3GPP TSG-RAN WG2 #58bis, "Discussion on Timing Advance Maintenance", Agenda Item: 4.3, Document for: Discussion, Decision, Orlando, USA, Jun. 25-29, 2007, 4 pages.

Extended European Search Report in Application No. 13178375.5-1854, Applicant: Sharp Kabushiki Kaisha, dated Sep. 3, 2013, 10 pages.

LG Electronics Inc., "UL Timing Control related to Contention Resolution", 3GPP TSG-RAN WG2 #61bis, R2-081607, Shenzhen, China, Mar. 31-Apr. 4, 2008, 3 pages.

(56) References Cited

OTHER PUBLICATIONS

Seung June Yi, et al., International Application No. PCT/KR2008/003462, International filed Jun. 18, 2008, Certified copy of priority document for U.S. Appl. No. 60/945,340, filed Jun. 20, 2007, 90 pages.
Sung Duck Chun, et al., International Application No. PCT/KR2008/003462, International filed Jun. 18, 2008, Certified copy of priority document for U.S. Appl. No. 60/944,785, filed Jun. 18, 2007, 102 pages.
Huawei Technologies Co., Ltd., Official European Communication of a Notice of Opposition, issued in International Application No. 09 011 154.3, Patent No. 2 144 476, dated Mar. 20, 2004, 1 page.
Huawei Technologies Co., Ltd., Notice of Opposition in European Patent issued in International Application No. 09 011 154.3, Patent No. 2 144 476, dated Mar. 12, 2014, 32 pages.
Sharp, "Detection of out of UL Sync", 3GPP TSG RAN WG2#58bis, R2-072377, Orlando, Florida, Jun. 25-29, 2007, 3 pages.
Ericsson, "Handling of Timing Advanced during RA", TSG RAN WG2 Meeting #62, R2-082403, Kansas City, May 5-9, 2008, 4 pages.

\* cited by examiner

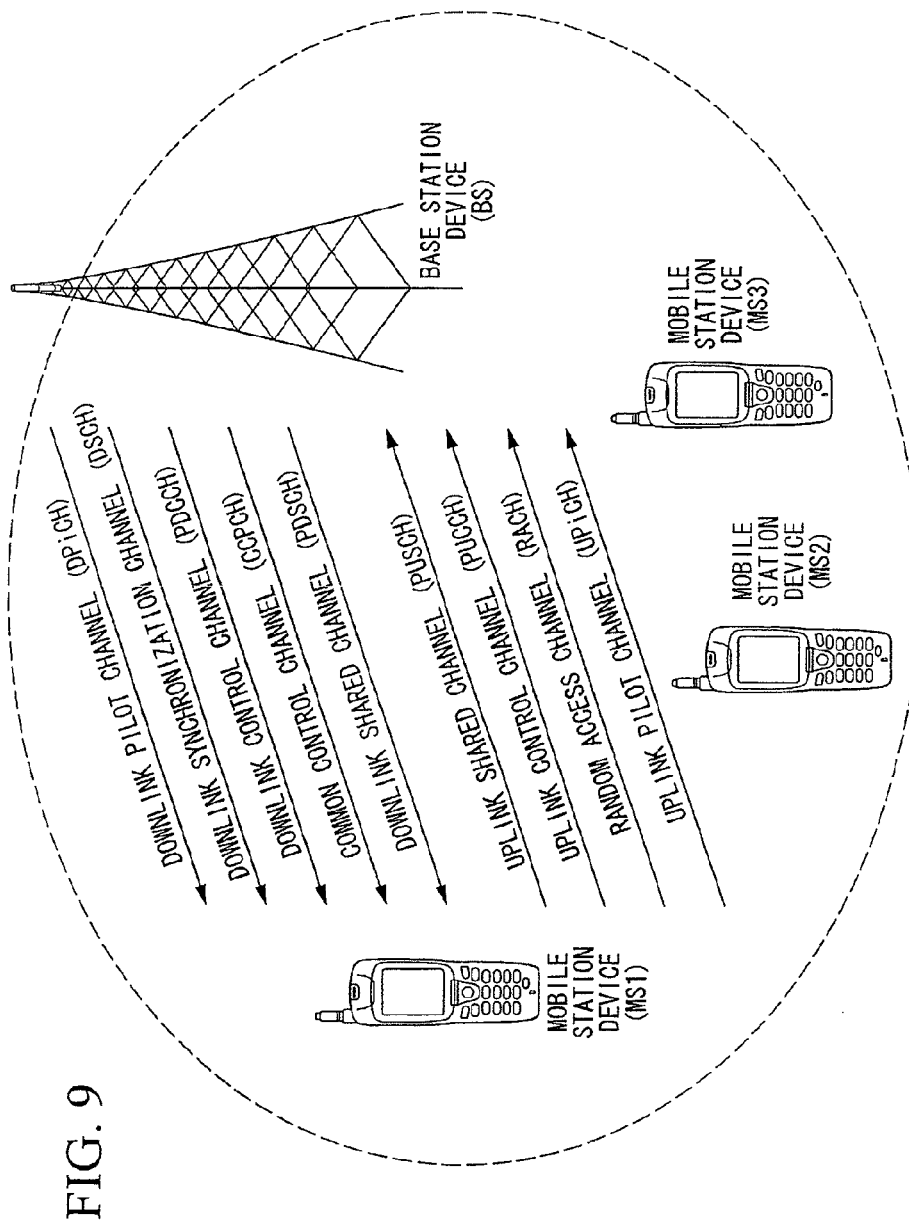
FIG. 9 -- Conventional Art --

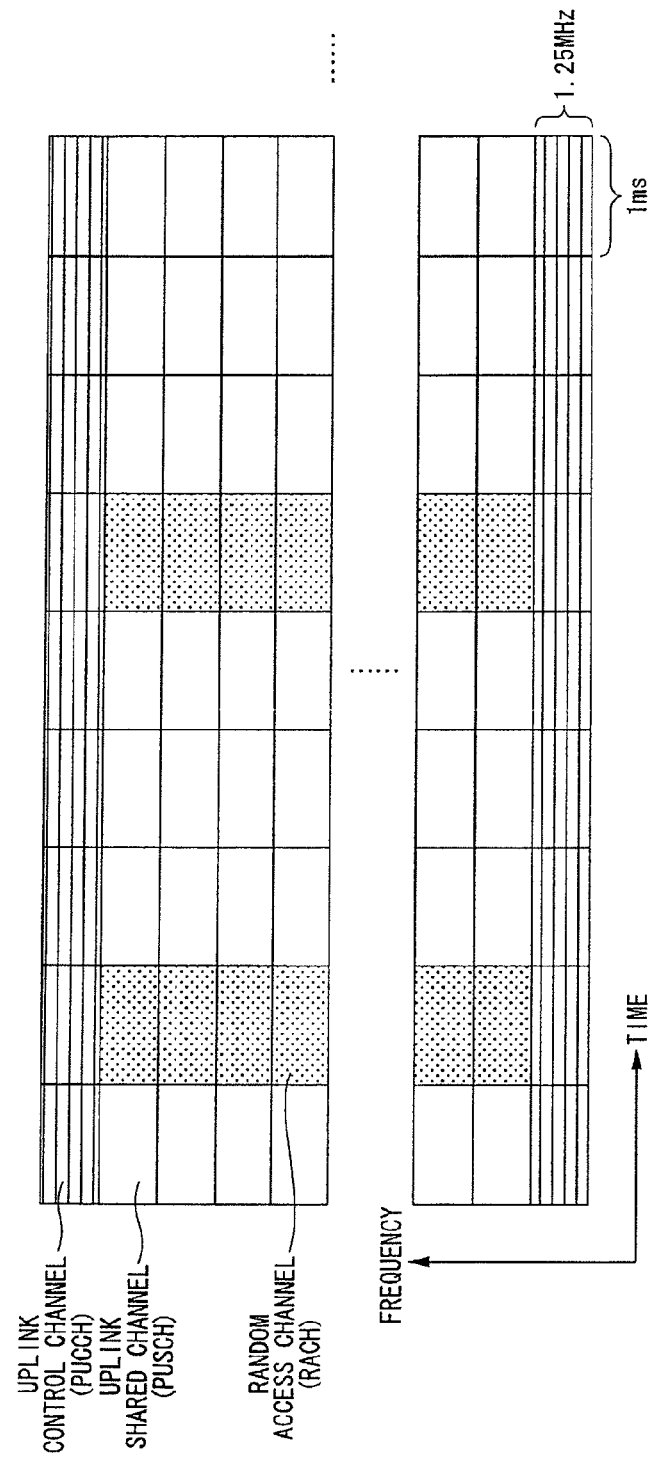

FIG. 11 -- Conventional Art --
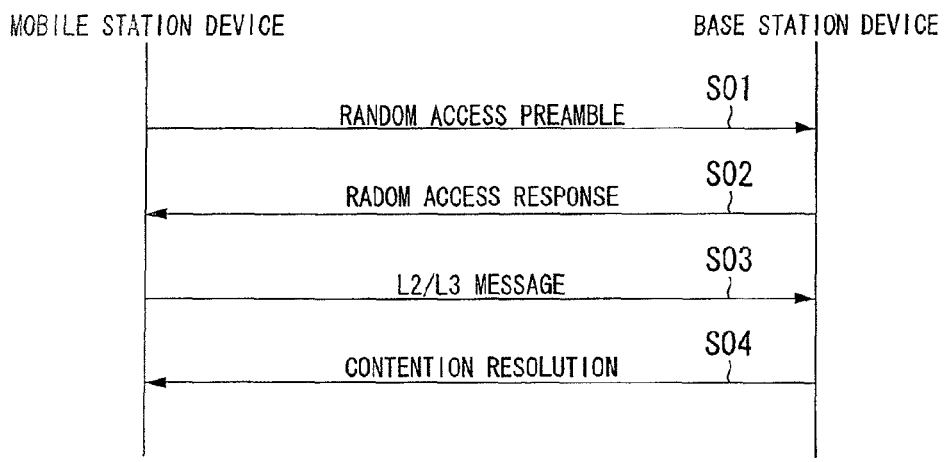
FIG. 12 -- Conventional Art --
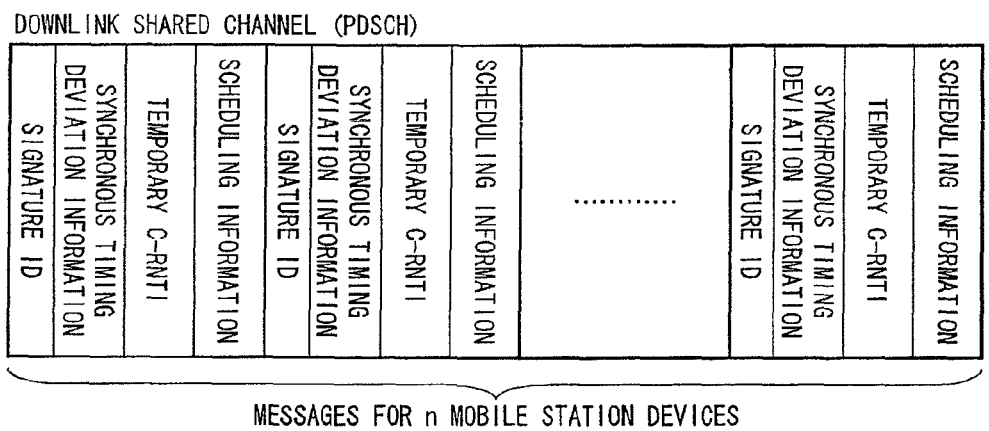
FIG. 13 -- Conventional Art --
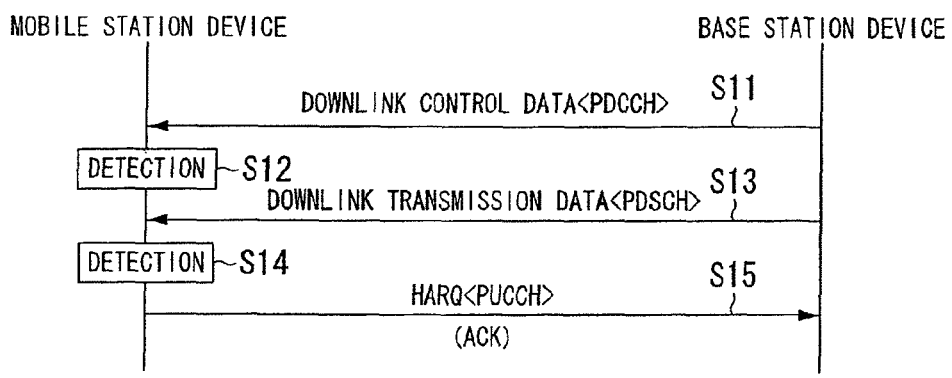

CONDITIONAL UPLINK TIMING ALIGNMENT IN A MOBILE STATION DEVICE OF A RADIO COMMUNICATION SYSTEM

The present application is a Divisional of co-pending U.S. application Ser. No. 12/529,160, filed Aug. 28, 2009, which was the National Stage of International Application No. PCT/JP2008/064217, filed on Aug. 7, 2008, which claimed priority to Japanese Patent Application No. 2007-207213 filed Aug. 8, 2007, the content of which is incorporated herein by reference.

TECHNICAL BACKGROUND

The present invention relates to radio communication systems and mobile station devices.

BACKGROUND ART

In the 3GPPP (3rd Generation Partnership Project), the W-CDMA (Wideband Code Division Multiple Access) system has been standardized as the third generation cellular mobile communication system so as to sequentially launch services. In addition, the HSDPA (High Speed Downlink Packet Access) system has been standardized so as to launch services.

The 3GPP is considering the evolution of third-generation radio accessing (EUTRA: Evolved Universal Terrestrial Radio Access). It proposes the OFDM (Orthogonal Frequency Division Multiplexing) system as the downlink of EUTRA. It also proposes a single carrier communication system based on the DFT (Discrete Fourier Transform)-spread OFDM system as the uplink of SUTRA.

FIG. 9 is an illustration showing uplink and downlink channel configurations for EUTRA. A base station device (BS) transmits data to mobile station devices (MS1, MS2, MS3, etc.) by use of downlinks. The mobile station devices (MS1, MS2, MS3, etc.) transmit data to the base station device (BS) by use of uplinks.

The downlink of EUTRA include a downlink pilot channel (DPiCH: Downlink Pilot Channel), a downlink synchronization channel (DSCH: Downlink Synchronization Channel), a downlink control channel (PDCCH: Physical Downlink Control Channel), a common control channel (CCPCH: Common Control Physical Channel), and a downlink shared channel (PDSCH: Physical Downlink Shared Channel).

The uplink of EUTRA include an uplink shared channel (PUSCH: Physical Uplink Shared Channel), an uplink control channel (PUCCH: Physical Uplink Control Channel), a random access channel (RACH: Random Access Channel), and an uplink pilot channel (UPiCH: Uplink Pilot Channel) (see Non-Patent Documents 1, 2).

FIG. 10 is a chart showing an example of an uplink radio resource configuration. In FIG. 10, the horizontal axis represents time, and the vertical axis represents frequency. FIG. 10 shows the configuration of a single radio frame, which is divided into a plurality of resource blocks. In FIG. 10, resource blocks are configured in units of regions each circumscribed with 1.25 MHz frequency-width and 1 ms time-width, so that the random access channel (RACH), the uplink shared channel (PUSCH), and the uplink control channel (PUCCH) illustrated in FIG. 9 are assigned to these regions. That is, the random access channels (RACH) are assigned to resource blocks illustrated as dot-hatching regions; the uplink shared channels (PUSCH) are assigned to resource blocks illustrated as blank regions; and the uplink control channels (PUCCH) are assigned to resource blocks illustrated as horizontal-line-hatching regions.

The random access channel (RACH) for the uplink of EUTRA includes asynchronous random access channels and synchronous random access channels. The asynchronous random access channel uses a minimum unit at a 1.25 MHz band. The base station device employs a plurality of random access channels to cope with accesses from numerous mobile station devices. The maximum object of using the asynchronous random access channel is to establish synchronization between the mobile station device and the base station device. The random access channel plays an additional role for issuing a scheduling request which is used by the mobile station device requesting a new uplink resource due to a shortage of assignment of resources (see Non-Patent Document 2).

Asynchronous random access includes two accesses, namely, a contended random access (or a contention-based random access) and a non-contended random access (or a non-contention-based random access).

The contended random access is a normally processed random access likely causing the contention between mobile station devices.

The non-contended random access is a random access causing no contention between base station devices, which is processed under the initiative of the base station device in case of handover or the like for rapidly establishing synchronization between the base station device and the mobile station device.

In asynchronous random access, the mobile station device transmits a preamble for establishing synchronization with the base station device. This is called a random access preamble. This preamble includes signatures, i.e. signal patterns representative of the information. A desired signature is selected from among several tens of preset signatures so as to designate the information consisting of several bits.

In recent EUTRA, the mobile station device transmits 6-bit information to the base station device by way of the signature. The 6-bit transmission needs sixty-four types of preambles, i.e. 2 to the 6th power. The 6-bit information is referred to as a preamble ID. In the 6-bit preamble ID, a random ID is assigned to five bits, while the information representing the amount of information needed for a random access request is assigned to the remaining one bit (see Non-Patent Document 3).

FIG. 11 is a sequence diagram showing a contended random access process for asynchronous random access. First, the mobile station device selects a signature based on various pieces of information such as the random ID and the downlink path-loss/CQI (Channel Quality Indicator), thus transmitting an random access preamble as a message M1 via an asynchronous random access channel (step S01).

Upon reception of the random access preamble from the mobile station device, the base station device calculates a synchronous timing deviation occurring between the mobile station device and the base station device on the basis of the random access preamble, thus, producing the synchronous timing deviation information; it performs scheduling to transmit an L2/L3 (Layer 2/Layer 3) message, thus producing the scheduling information; then, it assigns the temporary intra-cell identification information of the mobile station device (or T-C-RNTI: Temporary Cell-Radio Network Temporary Identity) to the mobile station device.

The base station device sets RA-RNTI (Random Access-Radio Network Temporary Identity), representing that a random access response to the mobile station device transmitting the random access preamble via the random access channel is set to the downlink shared channel (PDSCH), to the downlink control channel (PDCCH).

With the resource block for the downlink shared channel (PDSCH) notifying the allocation of the random access response via the RA-RNTI, the base station device transmits a message M2 representative of the random access response including the synchronous timing deviation information, the scheduling information, the T-C-RNTI and the received preamble ID number (or the random ID) to the base station device (step S02).

The RA-RNTI indicates a specific value which is not used as the C-RNTI (Cell-Radio Network Temporary Identity), so that the mobile station device detects the specific value to identify setting the random access response to the downlink shared channel (PDSCH).

FIG. 12 shows an example of allocation of the random access response to the downlink shared channel (PDSCH) when notifying the mobile station device of the allocation via the RA-RNTI. As illustrated in FIG. 11, in which the allocation of the random access response is notified using the RA-RNTI, the random access response including the synchronous timing deviation information, the scheduling information, the T-C-RNTI and the signature ID number of the received preamble are stored in a single resource block of the downlink shared channel (PDSCH) with respect to a plurality of mobile station devices (i.e. n devices where n is an integer of two or more in FIG. 12).

In FIG. 11, when the mobile station device identifies that the RA-RNTI is set to the downlink control channel (PDCCH) of the message M2, it assesses the content of the random access response set to the downlink shared channel (PDSCH) so as to extract the response including the signature ID number (or the random ID) of the transmitted preamble, thus correcting the synchronous timing deviation based on the synchronous timing deviation information within the response.

Based on the received scheduling information, the mobile station device transmits a message M3 representative of the L2/L3 message including at least the C-RNTI (or the core network ID such as the TMSI (Temporary Mobile Subscriber Identity)) in the scheduled resource block to the base station device (step S03).

Upon reception of the L2/L3 message from the mobile station device, the base station device refers to the C-RNTI (or the core network ID such as TMSI) included in the received L2/L3 message so as to transmit a message M4 representative of a contention resolution identifying the contention occurring between mobile station devices to the mobile station device (step S04). The procedures of steps S01 to-S04 are described in Non-Patent Document 3.

FIG. 13 is a sequence diagram showing a transmission process of downlink data from the base station device to the mobile station device according to the conventional technology. The process of FIG. 13 uses HARQ (Hybrid Automatic Repeat Request).

In the process of HARQ, the base station device transmits downlink control data to the mobile station device via the downlink control channel (PDCCH) (step S11).

Then, the mobile station device makes a decision whether or not to detect the downlink control data being transmitted in step S11 (step S12).

The base station device transmits downlink transmission data to the mobile station device via the downlink shared channel (PDSCH) (step S13).

Then, the mobile station device makes a decision whether or not to detect the downlink transmission data being transmitted in step S13 (step S14).

After decoding the data transmitted in step S11 and in step S13, the mobile station device feeds back ACK (Positive Acknowledgement) in the case of a success of CRC (Cyclic Redundancy Check) or NACK (Negative Acknowledgement) in the case of a failure of CRC to the base station device (step S15), thus making a determination whether or not to repeat transmission.

Just after reception of data via the downlink shared channel (PDSCH) in step S13, the ACK/NACK is transmitted via the uplink shared control channel (PUCCH).

Non-Patent Document 1: 3GPP TS (Technical Specification) 36.211, V1.10 (2007-05), Technical Specification Group Radio Access Network, Physical Channel and Modulation (Release 8)

Non-Patent Document 2: 3GPP TS (Technical Specification) 36.212, V1.20 (2007-05), Technical Specification Group Radio Access Network, Multiplexing and Channel Coding (Release 8)

Non-Patent Document 3: R2-072338 "Update on Mobility, Security, Random Access Procedure, etc." 3GPP TSG RAN WG2 Meeting #58 Kobe, Japan, 7-11 May, 2007.

DISCLOSURE OF INVENTION

Problem to be Solved by the Invention

In the UETRA, the mobile station device processing the contended random access according to the asynchronous random access needs to detect the random access response (message M2) by monitoring the RA-RNTI. In the case of the random access processed due to an uplink resource request, uplink synchronization of the mobile station device is maintained. Uplink synchronization is the most important factor in asynchronous random access but is not necessarily processed due to an uplink resource request. That is, the mobile station device is capable of performing uplink transmission on a feedback signal of HARQ in downlink communication, which will be thus continued.

When the mobile station device issuing an uplink resource request performs timing alignment (or synchronous deviation correction) based on the timing deviation information included in the random access response, the uplink synchronous/asynchronous state managed by the mobile station device may be inconsistent with the synchronous/asynchronous state managed by the base station device, thus causing a problem in needlessly triggering an error recovery process.

When the mobile station device issuing an uplink resource request monitors only the RA-RNTI in the random access response, it may erroneously ignore a downlink resource assignment notified by the C-RNTI. In this case, the mobile station device suffers from a problem in degrading the quality of downlink data communication due to the issuance of an uplink resource request.

In addition, when the base station device processes an uplink resource assignment by some triggering, if the mobile station device monitors only the RA-RNTI in the random access response, it may erroneously ignore the uplink resource assignment notified by the C-RNTI. In this case, the mobile station device suffers from a problem in failing to detect the uplink resource request being needlessly continued.

The present invention is created in light of the aforementioned circumstances, and an object thereof is to provide a mobile station device and a radio communication system capable of implementing highly efficient communications between mobile station devices and base station devices.

Means for Solving the Problems

The present invention is made to solve the above problems, wherein according to one embodiment of the present invention, a radio communication system is constituted of a mobile station device which transmits a random access preamble to a base station device and performs uplink timing alignment based on synchronization timing deviation information included in a random access response which the base station device transmits in response to the transmitted random access preamble, and the base station device which receives the random access preamble from the mobile station device and transmits a random access response including synchronization deviation information calculated based on the reception timing of the random access preamble to the mobile station device, wherein, in an uplink synchronous status, the mobile station device does not perform uplink timing alignment based on synchronization timing deviation information included in a random access response, which is a response to a random access preamble whose preamble ID is randomly selected by the mobile station device.

The uplink synchronous status is managed by a timer, so that the uplink synchronous status is sustained until the timer expires.

According to one embodiment of the present invention, the mobile station device transmits a random access preamble to a base station device and performs uplink timing alignment based on the synchronization timing deviation information included in a random access response which the base station device transmits in response to the transmitted random access preamble, wherein, in an uplink synchronous status, the mobile station device does not perform uplink timing alignment based on synchronization timing deviation information included in a random access response which is a response to a random access preamble whose preamble ID is randomly selected by the mobile station device.

The uplink synchronous status is managed by a timer, so that the uplink synchronous status is sustained until the timer expires.

According to one embodiment of the present invention, a radio communication system is constituted of a mobile station device which transmits a random access preamble to a base station device and resets a timer managing an uplink synchronous status based on the synchronization timing deviation information included in a random access response which the base station device transmits in response to the transmitted random access preamble, and the base station device which receives the random access preamble from the mobile station device and transmits a random access response including synchronization timing deviation information calculated based on the reception timing of the random access preamble, wherein, in an uplink synchronous status, the mobile station device does not perform to reset the timer based on the reception of synchronization timing deviation information included in a random access response that is a response to a random access preamble whose preamble ID is randomly selected by the mobile station device.

The uplink synchronous status is sustained until the timer expires.

According to one embodiment of the present invention, a mobile station device transmits a random access preamble to a base station device and resets a timer managing an uplink synchronous status based on reception of the synchronization timing deviation information included in a random access response that the base station device transmits in response to the transmitted random access preamble, wherein, in the uplink synchronous status, the mobile station device does not perform to reset the timer based on reception of synchronization timing deviation information included in a random access response which is a response to a random access preamble whose preamble ID is randomly selected by the mobile station device.

The uplink synchronous status is sustained until the timer expires.

According to one embodiment of the present invention, a radio communication system is constituted of a mobile station device which transmits a random access preamble to a base station device and transmits uplink data based on an uplink resource assignment notified by way of a random access response indicated by an RA-RNTI which the base station device transmits in response to the transmitted random access preamble, and the base station device which receives the random access preamble from the mobile station device and transmits, to the mobile station device, the RA-RNTI indicating the random access response notifying an uplink resource assignment in response to the received random access preamble to the mobile station device, wherein the mobile station device monitors both a C-RNTI notifying the uplink resource assignment from the base station device at an arbitrary timing and the RA-RNTI, thus transmitting uplink data.

According to one embodiment of the present invention, a mobile station device transmits a random access preamble to a base station device and transmits uplink data based on an uplink resource assignment notified by way of a random access response indicated by an RA-RNTI which the base station device transmits in response to the transmitted random access preamble, wherein the mobile station device monitors both a C-RNTI notifying an uplink resource assignment from the base station device at an arbitrary timing and the RA-RNTI, thus transmitting uplink data.

According to one embodiment of the present invention, a radio communication system is constituted of a mobile station device which transmits a random access preamble to a base station device and receives a random access response which the base station device transmits in response to the transmitted random access preamble, and the base station device which receives the random access preamble from the mobile station device and transmits a random access response in response to the received random access preamble, wherein the mobile station device concurrently receives downlink data which the base station device transmits at an arbitrary timing and the random access response.

According to one embodiment of the present invention, a radio communication system is constituted of a mobile station device which transmits a random access preamble to a base station device and receives a random access response based on an RA-RNTI which the base station device transmits in response to the transmitted random access preamble, and the base station device which receives the random access preamble from the mobile station device and transmits, to the mobile station device, the RA-RNTI notifying a resource assignment of the random access response in response to the received random access preamble, wherein the mobile station device monitors both a C-RNTI notifying a downlink resource assignment from the base station device at an arbitrary timing and the RA-RNTI, thus receiving both the random access response and downlink data or either the random access response or the downlink data.

According to one embodiment of the present invention, a mobile station device transmits a random access preamble to a base station device and receives a random access response which the base station device transmits in response to the transmitted random access preamble, wherein the mobile station device concurrently receives the random access response and downlink data which the base station device transmits at an arbitrary timing.

According to one embodiment of the present invention, a mobile station device transmits a random access preamble to a base station device and receives a random access response based on an RA-RNTI which the base station device transmits in response to the transmitted random access preamble, wherein the mobile station device monitors both a C-RNTI notifying a downlink resource assignment from the base station device at an arbitrary timing and the RA-RNTI, thus receiving both the random access response and downlink data or either the random access response or the downlink data.

Effect of the Invention

According to the present invention, it is possible to perform highly efficient communication between a mobile station device and a base station device.

BRIEF DESCRIPTION OF THE DRAWINGS

FIG. 9 is an illustration showing uplink and downlink channel configurations for EUTRA.

FIG. 10 is a chart showing an example of an uplink radio resource configuration.

FIG. 11 is a sequence diagram showing a contended random access process for an asynchronous random access.

FIG. 12 is an example of allocation of a random access response to a downlink shared channel (PDSCH) when notifying the mobile station device of an allocation of RA-RNTI.

FIG. 13 is a sequence diagram showing a transmission process of downlink data from the base station device to the mobile station device according to the conventional technology.

REFERENCE SYMBOLS

Figure 1:
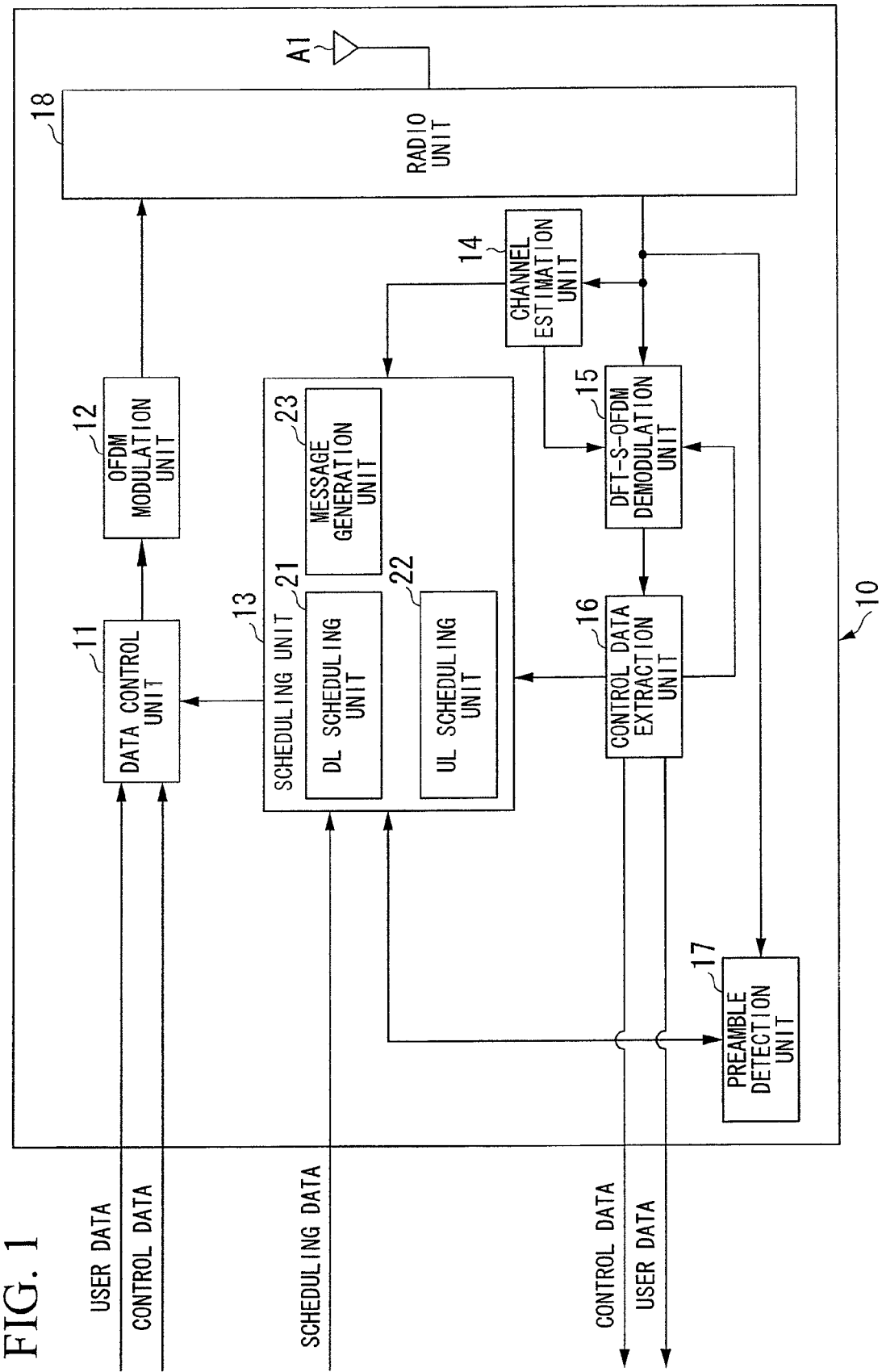
FIG. 1 is a schematic block diagram showing the constitution of a base station device 10 according to an embodiment of the present invention.

10 . . . base station device, 11 . . . data control unit, 12 . . . OFDM modulation unit, 13 . . . scheduling unit, 14 . . . channel estimation unit, 15 . . . DFT-S-OFDM demodulation unit, 16 . . . control data extraction unit, 17 . . . preamble detection unit, 18 . . . radio unit, 21 . . . DL scheduling unit, 22 . . . UL scheduling unit, 23 . . . message generation unit, 31 . . . C-RNTI detection unit, 32 . . . RA-RNTI detection unit, 33 . . . C-RNTI/RA-RNTI detection unit, 34 . . . detection switchover unit, 35 . . . extraction unit, 50 . . . mobile station device, 51 . . . data control unit, 52 . . . DFT-S-OFDM modulation unit, 53 . . . scheduling unit, 54 . . . OFDM demodulation unit, 55 . . . channel estimation unit, 56 . . . control data extraction unit, 57 . . . synchronization correction unit, 58 . . . preamble generation unit, 59 . . . preamble selection unit, 60 . . . radio unit, 531 . . . ACK/NACK transmission control unit, A1 . . . antenna, A2 . . . antenna.

BEST MODE FOR CARRYING OUT THE INVENTION

Hereinafter, an embodiment of the present invention will be described with reference to drawings. Similar to the EUTRA achieving the evolution of the third-generation radio access, the radio communication system of the present embodiment is constituted of a base station device and a plurality of mobile station devices. In the present embodiment, the communication link directed from the mobile station device to the base station device is referred to as an uplink, and the communication link directed from the base station device to the mobile station device is referred to as a downlink.

The downlink of the present embodiment is constituted of a downlink pilot channel (DPiCH), a downlink synchronization channel (DSCH), a downlink shared channel (PDSCH), a downlink control channel (PDCCH), and a common control channel (CCPCH).

The uplink of the present embodiment is constituted of an uplink pilot channel (UPiCH), a random access channel (RACH), an uplink shared channel (PUSCH), and an uplink control channel (PUCCH).

Similar to the foregoing one, radio resources of the present embodiment are divided into resource blocks corresponding to regions each circumscribed with 1.25 MHz frequency-width and 1 ms time-width. The base station device performs scheduling to assign resource blocks to mobile station devices, thus achieving radio communications with mobile station devices.

The present embodiment employs OFDMA (Orthogonal Frequency Division Multiple Access) as the downlink communication method and DFT-S-OFDM as the uplink communication method, so that resource blocks (blocks) are regions dividing radio resources in frequency and time directions, whereas in case of the communication method of TDMA (Time Division Multiple Access), resource blocks are regions dividing radio resources in the time direction. In the case of the communication method of FDMA (Frequency Division Multiple Access), resource blocks are regions dividing radio resources in the frequency direction. In the case of the communication method of CDMA (Code Division Multiple Access), resource blocks are regions dividing radio resources with spread codes.

The random access channel (RACH) of the present embodiment is used for a base station device. It is also used for a synchronizing mobile station device to issue a scheduling request (an uplink resource request) via the random access channel (RACH). The random access channel (RACH) is a channel having a guard time (e.g. 97 micro seconds) and is a channel which is available for a non-synchronizing mobile station performing transmission. Upon reception of a random access preamble (e.g. a preamble length of 0.8 ms) from the mobile station device, the base station device detects deviation of the arrival time of the preamble with respect to a reference time, thus generating timing deviation information. The precision of the timing deviation information is 0.52 micro seconds, for example.

The asynchronous random access is divided into two types of accesses, i.e. contended random access and non-contended random access. The contended random access is a random access in which a contention likely occurs between mobile station devices because the mobile station device determines a preamble ID number so as to send it to the base station device.

The non-contended random access is a random access in which no contention occurs between mobile station devices because the mobile station device transmits the preamble ID number designated by the base station device. The preamble ID number used for the contended random access is notified in advance and is not used for the non-contended random access. Therefore, it is possible to discriminate between the contended random access and the non-contended random access with reference to the preamble ID number.

FIG. 1 is a schematic block diagram showing the constitution of a base station device 10 according to the embodiment of the present invention.

The base station device 10 includes a data control unit 11 (referred to as a response control data transmission unit, a downlink control data transmission unit, or a downlink control channel transmission unit), an OFDM modulation unit 12, a scheduling unit 13, a channel estimation unit 14, a DFT-S-OFDM (DFT-spread OFDM) demodulation unit 15, a control data extraction unit 16, a preamble detection unit 17 (referred to as a preamble reception unit), a radio unit 18, and an antenna A1. A base station communication unit 19 is constituted of the data control unit 11, the OFDM modulation unit 12, the scheduling unit 13, the channel estimation unit 14, the DFT-S-OFDM demodulation unit 15, the control data extraction unit 16, the preamble detection unit 17, the radio unit 18, and the antenna A1.

A transmission unit 20 is constituted of the data control unit 11, the OFDM modulation unit 12, the radio unit 18, and the antenna A1, while the reception unit 21 is constituted of the channel estimation unit 14, the DFT-S-OFDM demodulation unit 15, the control data extraction unit 16, the preamble detection unit 17, the radio unit 18, and the antenna A1.

With respect to control data and user data (including random access responses and preamble assignment information) given by an upper layer (not shown), the data control unit 11, in accordance with instructions given by the scheduling unit 13, performs mapping control data onto the downlink pilot channel (DPiCH), the downlink synchronization channel (DSCH), the downlink control channel (PDCCH), and the common control channel (CCPCH), and performs mapping user data for each mobile station device and control data for a MAC layer (Medium Access Control: Layer 2) or a higher layer onto the downlink shared channel (PDSCH), thus outputting mapping data to the OFDM modulation unit 12.

The OFDM modulation unit 12 performs a variety of OFDM signal processing such as data modulation, series/parallel conversion, IFFT (Inverse Fast Fourier Transform), CP (Cyclic Prefix) insertion, and filtering on user data and control data subjected to mapping with respect to each channel, thus generating and outputting OFDM signals to the radio unit 18.

The radio unit 18 performs up-conversion on OFDM signals outputted from the OFDM modulation unit 12 into the radio frequencies, thus transmitting them to the mobile station device via the antenna A1.

The radio unit 18 receives uplink signals from the mobile station device via the antenna A1, wherein received signals are subjected to down-conversion into baseband signals, which are then forwarded to the DFT-S-OFDM demodulation unit 15, the channel estimation unit 14, and the preamble detection unit 17.

The channel estimation unit 14 estimates characteristics of a radio propagation path with respect to the uplink pilot channel (UPiCH) based on baseband signals outputted from the radio unit 18, thus outputting an estimation result of the radio propagation path to the DFT-S-OFDM demodulation unit 15. The channel estimation unit 14 outputs the estimation result of the radio propagation path to the scheduling unit 13 so as to perform uplink scheduling with respect to the uplink pilot channel (UPiCH) of the radio unit 18.

In accordance with the estimation result of the radio propagation path and a DFT-S-OFDM demodulation unit 15 performs DFT-spread-OFDM demodulation on baseband signals outputted from the radio unit 18, thus generating and outputting reception data to the control data extraction unit 16.

As the uplink communication method, the present embodiment uses either a single carrier method of DFT-spread-OFDM or a multicarrier method of OFDM.

The control data extraction unit 16 performs true-false discrimination on reception data outputted from the DFT-S-OFDM demodulation unit 15, thus outputting the discrimination result to the scheduling unit 13. When reception data is true, the control data extraction unit 16 divides reception data into user data and control data.

The control data extraction unit 16 outputs, to the scheduling unit 13, control data representing the downlink CQI information, ACK/NACK of downlink data, and Layer 2 regarding a resource assignment request, while it outputs, to an upper layer (not shown) of the base station device 10, control data regarding the Layer 3 or the like and user data.

When reception data is false, the control data extraction unit 16 preserves reception data to be mixed with retransmission data and then, it performs mixing upon reception of retransmission data.

The preamble detection unit 17 detects a preamble from baseband signals outputted from the radio unit 18 and then calculates a synchronization timing deviation based on the preamble, thus outputting the synchronization timing deviation to the scheduling unit 13 together with the preamble ID number denoted by the preamble.

The scheduling unit 13 includes a DL (Down Link) scheduling unit 21 implementing downlink scheduling and a UL (Up Link) scheduling unit 22 implementing uplink scheduling, and a message generation unit 23.

The DL scheduling unit 21 performs scheduling for mapping user data onto downlink channels on the basis of the CQI information notified by the mobile station device and the user data information notified by the upper layer as well as control data generated by the message generation unit 23.

In accordance with the estimation result of an uplink radio propagation path outputted from the channel estimation unit 14 and the resource assignment request of the mobile station device outputted from the control data extraction unit 16, the UL scheduling unit 22 performs scheduling for mapping user data onto uplink channels.

The message generation unit 23 generates the downlink resource assignment information, the uplink resource assignment, ACK/NACK of uplink data, and control data such as random access responses. The message generation unit 23 stores, in the random access response message, the preamble ID number and the synchronization timing deviation information representing the synchronization timing deviation outputted from the preamble detection unit 17 when generating the random access response message.

Figure 2:
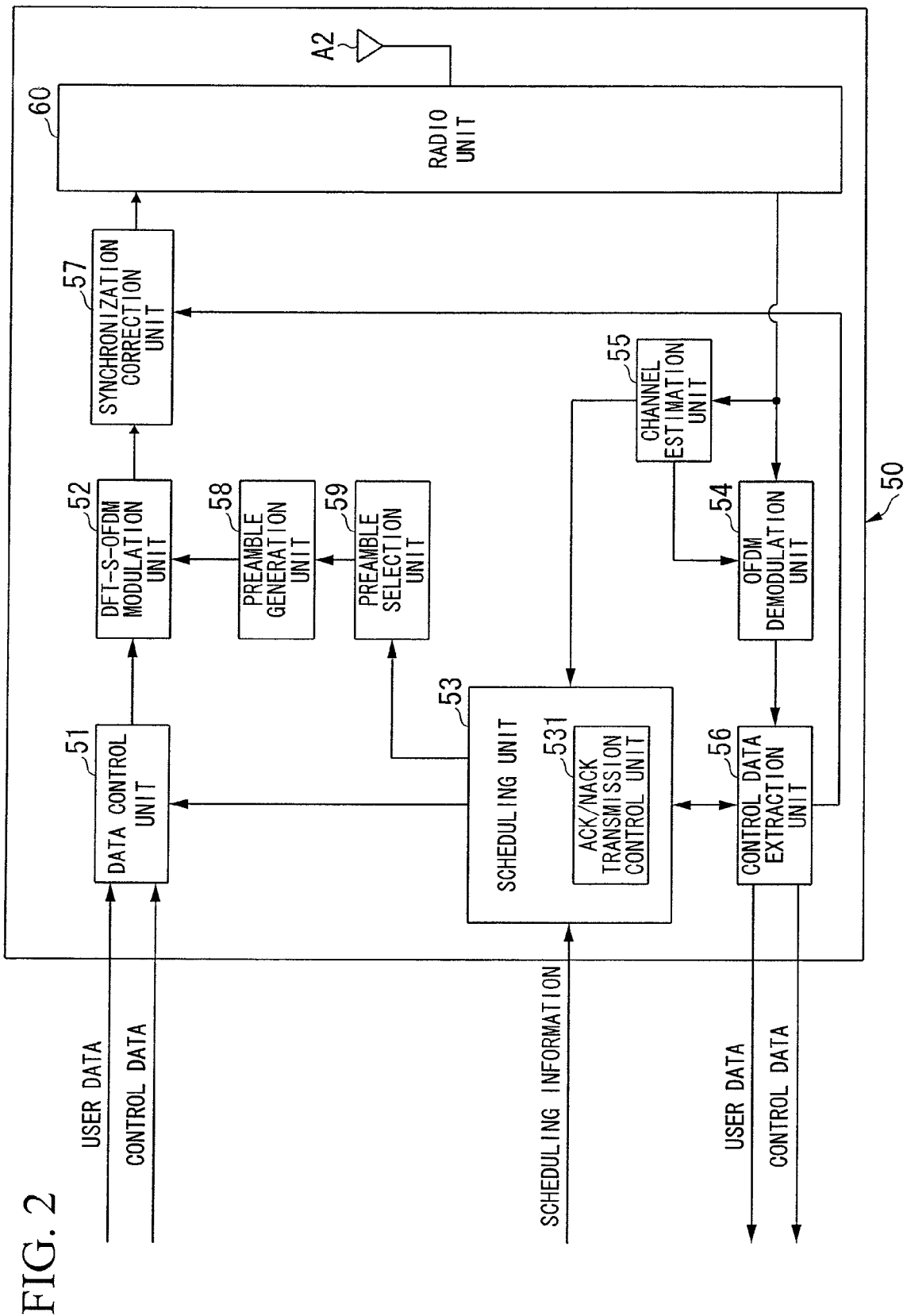
FIG. 2 is a schematic block diagram showing the constitution of a mobile station device 50 according to the embodiment of the present invention.

FIG. 2 is a schematic block diagram showing the constitution of the mobile station device 50 according to the embodiment of the present invention:—

The base station device 50 includes a data control unit 51 (referred to as a preamble transmission unit), a DFT-S-OFDM modulation unit 52, a scheduling unit 53, an OFDM demodulation unit 54, a channel estimation unit 55, a control data extraction unit 56 (referred to as a judgment unit or a downlink control channel reception unit), a synchronization correction unit 57, a preamble generation unit 58, a preamble selection unit 59, a radio unit 60, and an antenna A2. A mobile station communication unit 61 is constituted of the data control unit 51, the DFT-S-OFDM modulation unit 52, the scheduling unit 53, the OFDM demodulation unit 54, the channel estimation unit 55, the control data extraction unit 56, the synchronization correction unit 57, the preamble generation unit 58, the preamble selection unit 59, the radio unit 60, and the antenna A2.

A transmission unit 62 is constituted of the data control unit 51, the DFT-S-OFDM modulation unit 52, the synchronization correction unit 57, the preamble generation unit 58, the preamble selection unit 59, the radio unit 60, and the antenna A2. A reception unit 63 is constituted of the OFDM demodulation unit 54, the channel estimation unit 55, the control data extraction unit 56, the radio unit 60, and the antenna A2.

In accordance with instructions given by the scheduling unit 53, the data control unit 51 allocates control data (including preambles and ACK/NACK) and user data given by an upper layer (not shown) of the mobile station device 50 so as to transmit them to the base station device via the random access channel (RACH), the uplink shared channel (PUSCH), and the uplink control channel (PUCCH).

In this connection, the data control unit 51 sets the random access channel (RACH) with respect to a preamble while setting the uplink control channel (PUCCH) with respect to ACK/NACK. In addition, the data control unit 51 sets the uplink pilot channel (UPiCH).

The DFT-S-OFDM modulation unit 52 performs a variety of DFT-S-OFDM signal processing such as data modulation, DFT conversion, sub-carrier mapping, IFFT, CP insertion, and filtering on user data and control data allocated to channels, thus generating and outputting DFT-Spread-OFDM signals to the synchronization correction unit 57.

Based on the synchronization timing deviation information outputted from the control data extraction unit 56, the synchronization correction unit 57 corrects the transmission timing with respect to DFT-Spread-OFDM outputted from the DFT-S-OFDM modulation unit 52, thus outputting them to the radio unit 60.

Upon setting radio frequencies designated by a radio control unit (not shown), the radio unit 60 performs up-conversion on DFT-Spread-OFDM signals outputted from the synchronization correction unit 57 into the radio frequencies, thus transmitting them to the base station device via the antenna A2.

Upon reception of downlink signals from the base station device via the antenna A2, the radio unit 60 performs down-conversion on received signals into baseband signals, thus outputting them to the OFDM demodulation unit 54 and the channel estimation unit 55.

The channel estimation unit 55 estimates characteristics of a radio propagation path with reference to the downlink pilot channel (DPiCH) included in baseband signals outputted from the radio unit 60, thus outputting the estimation result to the OFDM demodulation unit 54. The channel estimation unit 55 converts the estimation result into CQI information so as to transmit the estimation result of the radio propagation path to the base station device, thus outputting the CQI information to the scheduling unit 53.

With reference to the estimation result of the radio propagation path outputted from the channel estimation unit 55, the OFDM demodulation unit 54 demodulates baseband signals outputted from the radio unit 60 into reception data, thus outputting them to the control data extraction unit 56.

The control data extraction unit 56 divides reception data outputted from the OFDM demodulation unit 54 into user data and control data. The control data extraction unit 56 outputs the synchronization timing deviation information of control data to the synchronization correction unit 57, outputs the scheduling information and other Layer 2 control data to the scheduling unit 53, and outputs user data and Layer 3 control data to the upper layer (not shown) of the mobile station device 50.

In accordance with the scheduling information outputted from the upper layer of the mobile station device 50 and the control data of the base station device outputted from the control data extraction unit 56, the scheduling unit 53 instructs the data control unit 51 to perform mapping the control information and data onto channels.

When making random access to the base station device, the scheduling unit 53 instructs the preamble selection unit 59 to make random access upon selecting the preamble ID number and instructs the reception method for the control data extraction unit 56.

The scheduling unit 53 manages the uplink synchronous/asynchronous status and manages either the uplink synchronous status or the uplink asynchronous status when making random access to the base station device, thus instructing the reception method for the control data extraction unit 56.

When instructing the reception method for the control data extraction unit 56, the scheduling unit 53 instructs the control data extraction unit 56 to monitor the C-RNTI for use in reception of downlink data and transmission of uplink data and the RA-RNTI and to receive a random access response message, in case of processing an uplink resource request.

When making random access irrelevant to the uplink resource request (or when making random access in the uplink asynchronous status), it instructs the control data extraction unit 56 to monitor the RA-RNTI and to receive the random access response message. When receiving downlink data or when transmitting uplink data, it instructs the control data extraction unit 56 to monitor the C-RNTI. Downlink control data for use in reception of downlink data and an uplink grant for use in transmission of uplink data are set to the downlink control channel (PDCCH) with different formats, whereas the same C-RNTI is used for the identification information of the mobile station device. When making random access relevant to the uplink resource request (or when making random access in the uplink synchronous status), it instructs the control data extraction unit 56 to monitor both the C-RNTI and the RA-RNTI.

The scheduling unit 53 is equipped with an ACK/NACK transmission control unit 531. The ACK/NACK transmission control unit 531 rectifies the transmission method for ACK/NACK based on the transmission timing of the message M3 and the result of CRC detected by the control data extraction unit 56.

The scheduling unit 53 instructs the preamble selection unit 59 to select the preamble ID number used for random access, thus outputting the selected preamble ID number to the preamble generation unit 58.

The preamble generation unit 58 generates the preamble based on the preamble ID number selected by the preamble selection unit 59, thus outputting it to the DFT-S-OFDM modulation unit 52.

Figure 3:
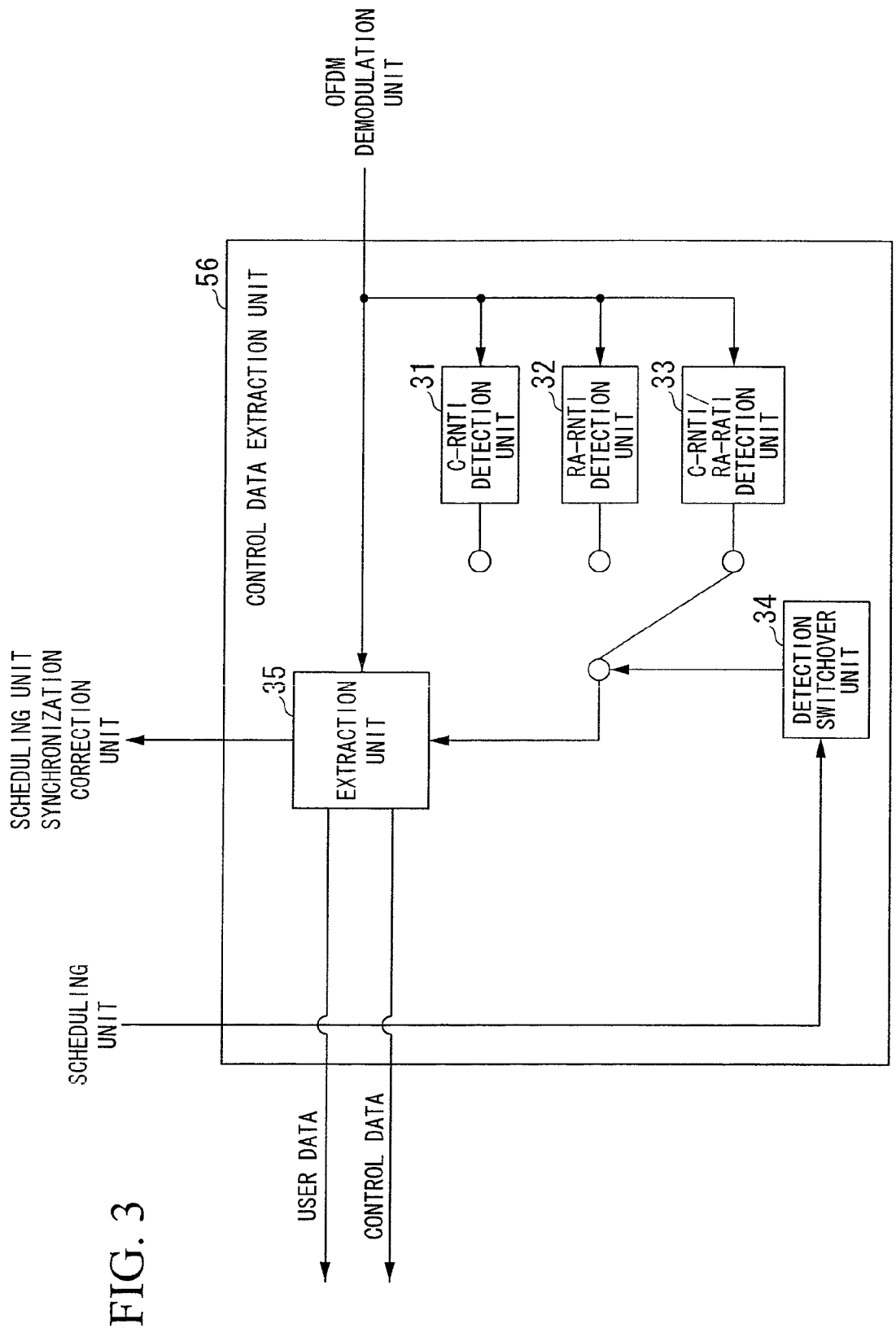
FIG. 3 is a schematic block diagram showing the constitution of a control data extraction unit 56 of the mobile station device 50 (FIG. 2) according to the embodiment of the present invention.

FIG. 3 is a schematic block diagram showing the constitution of the control data extraction unit 56 of the mobile station device 50 (FIG. 2) according to the embodiment of the present invention. The control data extraction unit 56 includes a C-RNTI detection unit 31, a RA-RNTI detection unit 32, a C-RNTI/RA-RNTI detection unit 33, a detection switchover unit 34, and an extraction unit 35.

The C-RNTI detection unit 31 detects the C-RNTI assigned to the mobile station itself from the downlink control channel (PDCCH) outputted from the OFDM demodulation unit 54 (FIG. 2) so as to extract the control information pertaining to the C-RNTI from the downlink control channel (PDCCH) and to analyze the control information, thus identifying either the downlink shared channel (PDSCH) or the uplink shared channel (PUSCH) being assigned to the mobile station itself. The C-RNTI detection unit 31 outputs the analysis result to the extraction unit 35.

The RA-RNTI detection unit 32 detects the RA-RNTI from the downlink control channel (PDCCH) outputted from the OFDM demodulation unit 54 (FIG. 2) so as to extract the control information pertaining to the RA-RNTI from the downlink control channel (PDCCH) and to analyze the control information, thus identifying the downlink shared channel (PDSCH) assigned to the random access response. The RA-RNTI detection unit 32 outputs the analysis result to the extraction unit 35.

The C-RNTI/RA-RNTI detection unit 33 detects either the C-RNTI or the RA-RNTI being assigned to the mobile station itself from the downlink control channel (PDCCH) outputted from the OFDM demodulation unit 54 (FIG. 2) so as to extract the control information pertaining to the C-RNTI or the RA-RNTI from the downlink control channel (PDCCH) and to analyze the control information, thus outputting the analysis result to the extraction unit 35.

The scheduling unit 53 instructs the detection switchover unit 34 to switch over the C-RNTI detection unit 31, the RA-RNTI detection unit 32, and the C-RNTI/RA-RNTI detection unit 33, thus forwarding any one of the output data to the extraction unit 35.

Based on the analysis result of the control information corresponding to any one of the output data of the C-RNTI detection unit 31, the RA-RNTI detection unit 32, and the C-RNTI/RA-RNTI detection unit 33, the extraction unit 35 extracts data (including the random access response message) from the downlink shared channel (PDSCH) assigned to the mobile station device itself.

Upon extraction of the random access response from the downlink shared channel (PDSCH), it outputs control data including the random access response message (such as the synchronization timing deviation information) to the scheduling unit 35 (FIG. 2) and the synchronization correction unit 57 (FIG. 2) while outputting user data to the upper layer (not shown) of the mobile station device 50. Upon extraction of downlink data from the downlink shared channel (PDSCH), it outputs control data including the CRC result to the scheduling unit 35 while outputting user data to the upper layer (not shown) of the mobile station device 50.

The mobile station device and the base station device manage the uplink synchronous/asynchronous status of the mobile station device by use of a timer. The base station device transmits the synchronization timing deviation information to the mobile station device by way of the random access response or a timing alignment command message. The base station device resets the timer when transmitting the synchronization timing deviation information or the mobile station device resets the timer when receiving the synchronization timing deviation information. The base station device notifies the mobile station device of an expiration value of the timer by way of a broadcast signal or a dedicated signal. The base station device and the mobile station device manage the uplink synchronous/asynchronous status as the uplink synchronous status until the expiration of the timer.

The base station device and the mobile station device manage the uplink synchronous/asynchronous status as the uplink asynchronous status after the expiration of the timer. The timing alignment command message is generated by the base station upon detection of a synchronization timing deviation occurring in the uplink transmission (using normal data, uplink pilot channels, etc.) from the mobile station device.

Figure 4:
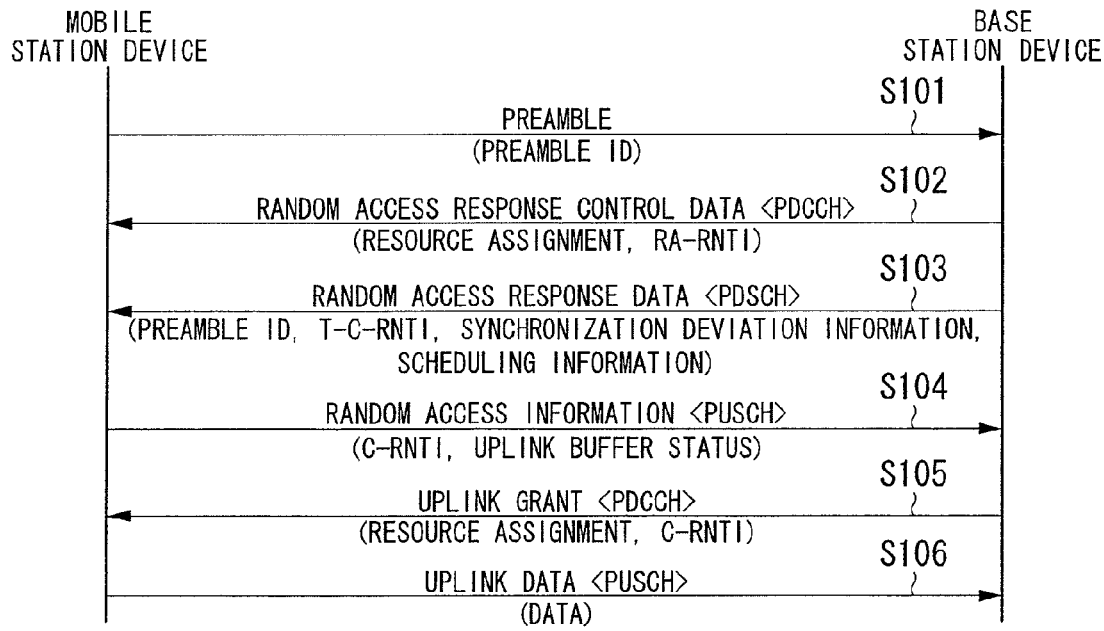
FIG. 4 is a sequence diagram showing the processing of a radio communication system according to the embodiment of the present invention.

FIG. 4 is a sequence diagram showing a processing of the radio communication system according to the embodiment of the present invention.

The sequence diagram of FIG. 4 shows the processing regarding an uplink resource request by way of a contended random access. This shows the processing for issuing the uplink resource request due to the occurrence of data to be transmitted in the mobile station device in the uplink asynchronous status. The mobile station device transmits a preamble of a preamble ID number, which is randomly selected from among preamble IDs available for the contended random access, to the base station device (step S101).

The base station device detects the above preamble transmitted thereto from the mobile station device. Herein, the preamble is a signal pattern suited to the preamble ID number, wherein the base station device detects the preamble upon detecting a reception signal matching the signal pattern of the preamble ID number.

The random access response, which is illustrated in step S02 of FIG. 11 and which is transmitted to the mobile station device from the base station device, is constituted of random access response control data (step S102) being transmitted via the downlink control channel (PDCCH) and random access response data (step S103) being transmitted via the downlink shared channel (PDSCH).

The base station device transmits random access response control data including the RA-RNTI and the resource assignment information to the mobile station device via the downlink control channel (PDCCH) (step S102), thus designating a resource block (PDSCH) for allocating the random access response data.

In addition, the base station device transmits random access response data in the resource block designated by the random access response control data (step S103).

After completion of transmission of the preamble to the base station device, the mobile station device receives the random access response control data and random access response data from the base station device (steps S102, S103). The mobile station device receives a random access response message for the preamble previously transmitted by itself by way of acquisition of the message whose preamble ID number which is included in the random access response data matches the preamble ID number of the preamble previously transmitted by itself. The mobile station device aligns the uplink timing (or uplink synchronization processing) and resets the timer on the basis of the synchronization timing deviation information included in the random access response message.

The mobile station device transmits the L2/L3 message (random access information) (message M3) including the C-RNTI to the base station device in the resource designated by the scheduling information included in the random access response message (step S104). The random access information includes the information representative of the uplink resource request and an uplink buffer status representative of the amount of uplink data stored in an uplink buffer.

The base station device transmits an uplink grant responsive to the uplink resource request to the mobile station device via the downlink control channel (PDCCH) (step S105). The mobile station device receiving the uplink grant transmits uplink data to the base station device via the uplink shared channel (PUSCH) (step S106).

Figure 5:
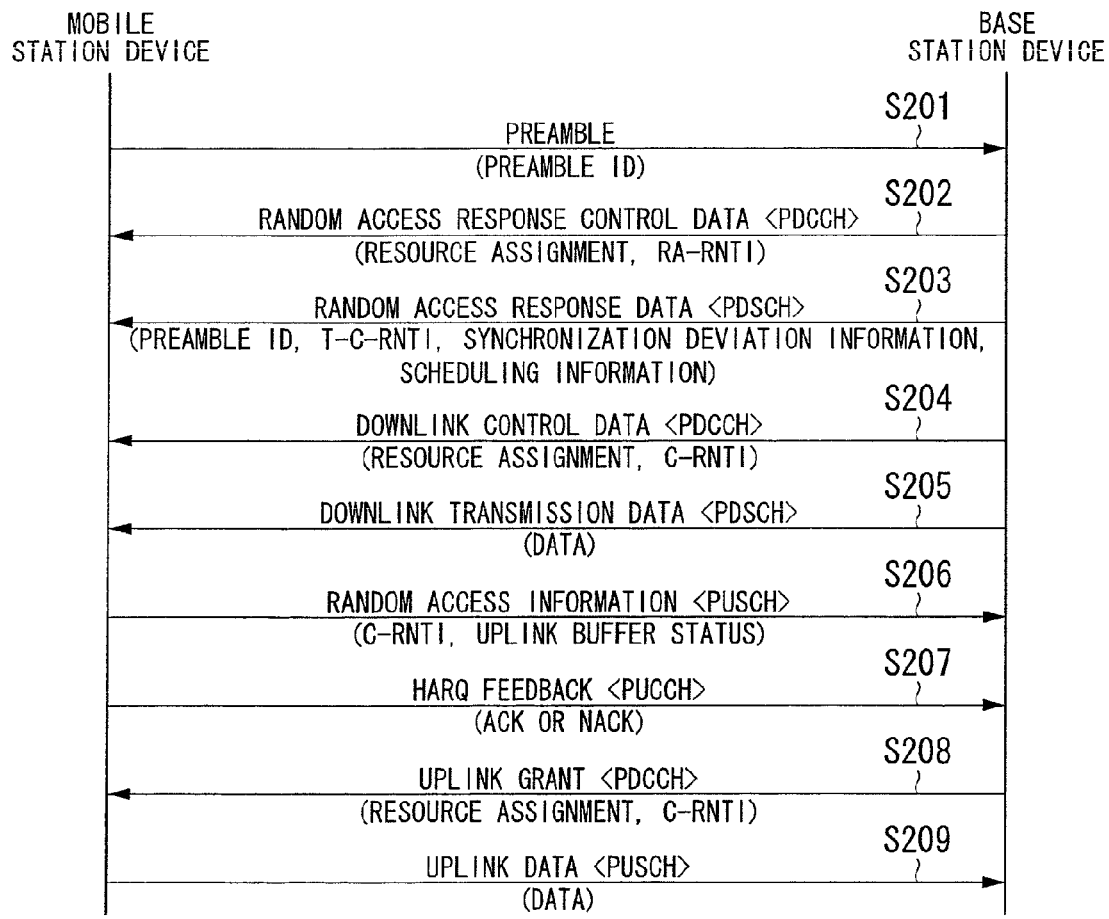
FIG. 5 is a sequence diagram showing the processing of the radio communication system according to the embodiment of the present invention.

FIG. 5 is a sequence diagram showing a processing of the radio communication system according to the embodiment of the present invention.

FIG. 5 shows the concurrent execution of the random access processing and the downlink data communication processing. This shows the processing for issuing an uplink resource request due to the occurrence of data which should be transmitted in the mobile station device in the uplink synchronization status. First, the transmission unit 62 of the mobile station device transmits the preamble including the preamble ID number via the random access channel, thus transmitting the uplink resource request (step S201).

The reception unit 21 of the base station device 10 receives the above preamble from the mobile station device 50. The reception unit 21 receiving the preamble transmits the random access response control data to the mobile station device 50. That is, the transmission unit 20 transmits the random access response control data including the RA-RNTI information and the resource assignment for the random access response data to the mobile station device 50 via the downlink control channel (PDCCH) (step S202). The reception unit 63 of the mobile station device 50 receives the data which the base station device 10 transmits via the downlink control channel (PDCCH) in step S202. The control data extraction unit 56 makes a decision as to whether or not the RA-RNTI is included in the downlink control channel (PDCCH) received by the reception unit 63 in step S202, wherein it makes a decision as to whether or not it is the response control data which is transmitted by the base station device 10 in response to the preamble transmitted by the transmission unit 62.

Next, the transmission unit 20 of the base station device 10 transmits the random access response data including the preamble ID, the T-C-RNTI, the synchronization deviation information, and the scheduling information for the message M3 to the mobile station device 50 via the downlink shared channel (PDSCH) (step S203).

Then, the control data extraction unit 56 of the mobile station device 50 performs cyclic redundancy checking (CRC) on the reception data of the reception unit 63 in step S203, wherein it receives the random access response message for the preamble previously transmitted by itself by way of acquisition of the message whose preamble ID number which is included in the random access response data matches the preamble ID number previously transmitted by itself.

The base station device 10 transmits the downlink data to the mobile station device in parallel with the random access response (steps S204, S205). The transmission unit 20 of the base station device 10 transmits the downlink control data including the resource assignment and the C-RNTI information to the mobile station device 50 via the downlink control channel (PDCCH) (step S204). The reception unit 63 of the mobile station device 50 receives the downlink control data transmitted thereto from the base station device 10.

The control data extraction unit 56 of the mobile station device 50 makes a decision as to whether or not the C-RNTI for the mobile station device itself is included in the reception data of the reception unit 63 in step S204, wherein when the C-RNTI for the mobile station device itself is included, it recognizes the resource position and the modulation method with respect to the subsequent downlink shared channel (PDSCH).

Next, the transmission unit 20 of the base station device 10 transmits the downlink transmission data including data destined to the mobile station device 50 to the mobile station device 50 via the downlink shared channel (PDSCH) (step S205).

The control data extraction unit 56 of the mobile station device 50 performs cyclic redundancy checking (CRC) on the reception data of the reception unit 63 in step S204.

The step S202, the steps S203 and S204, and the step S205 are executed in parallel.

Upon detection of the random access response message to the preamble previously transmitted by itself, the mobile station device 50 discards the synchronization timing deviation information included in the random access response message, thus not performing the uplink timing alignment (uplink synchronization processing) and not performing the reset of the timer by use of the synchronization timing deviation information included in the random access response message. This prevents inconsistency occurring between the base station device and the mobile station device in terms of the uplink synchronous/asynchronous status. Since no confirmation is secured as to whether or not the detected timing deviation information derives from the preamble by itself, it is unadvisable to perform timing alignment. Since the reset of the timer causes inconsistency between the base station device and the mobile station device with respect to the synchronization sustainable time, it is advisable to maintain the present operation of the timer. The base station device and the mobile station device are supposed to maintain the previous uplink synchronous/asynchronous status prior to the random access. This eliminates the necessity of needlessly executing the error recovery process.

The transmission unit 62 of the mobile station device 50 transmits the L2/L3 message including the C-RNTI (random access information) to the base station device 10 via the uplink shared channel (PUSCH) designated by the scheduling information included in the random access response message (message M3) (step S206). The random access information includes the information representative of the uplink resource request and the uplink buffer status representative of the amount of uplink data stored in the uplink buffer.

Upon detecting the C-RNTI for itself with the control data extraction unit 56, the transmission unit 62 of the mobile station device 50 transmits a HARQ feedback including the information of ACK or NACK to the base station device 10 via the uplink control channel (PUCCH) (step S207). The step S206 and the step S207 are executed in parallel.

The transmission unit 20 of the base station device 10 transmits the uplink grant including the resource assignment and the C-RNTI to the mobile station device 50 via the downlink control channel (PDCCH) (step S208). The reception unit 63 of the mobile station device 50 receives the uplink grant transmitted thereto from the base station device 10.

The control data extraction unit 56 of the mobile station device 50 makes a decision as to whether or not the C-RNTI for the mobile station itself is included in the reception data of the reception unit 63 in step S208, wherein when the C-RNTI for the mobile station itself is included, it recognizes the resource position and the modulation method with respect to the subsequent uplink shared channel (PUSCH) based on the resource assignment information.

Next, upon detecting the C-RNTI for the mobile station itself in the uplink grant, the transmission unit 62 of the mobile station device 50 transmits, to the base station device 10, the uplink data including the data destined to the base station device via the uplink shared channel (PUSCH) (step S209).

In the execution of the aforementioned steps S201 to S209, the mobile station device 50 performs uplink communication with the base station device 10 by use of the resource assignment included in the uplink grant received by the reception unit 63 in step S208 while performing downlink communication with the base station device 10 by use of the resource assignment included in the downlink control data received by the reception unit 63 in step S204.

In addition, the base station device 10 performs uplink communication with the mobile station device 50 by use of the resource assignment included in the uplink grant transmitted by the transmission unit 20 in step S208 while performing downlink communication with the mobile station device 50 by use of the resource assignment included in the downlink control data transmitted by the transmission unit 20 in step S204.

The base station device cannot recognize which mobile station makes a random access until acquiring the random access information transmitted thereto with the message M3. Therefore, it handles the transmission of the random access response and the downlink data to the mobile station device in parallel.

In a random access to the base station device, the mobile station device in the uplink synchronous status monitors the downlink control channel (PDCCH) while verifying both the C-RNTI designating the downlink control data or the uplink grant and the RA-RNTI designating the random access response control data.

The mobile station device does not transmit ACK/NACK when the transmission timing of ACK/NACK for the downlink data scheduled by the C-RNTI overlaps the transmission timing of the above message M3. Since the mobile station device performs single-carrier transmission on uplink data to the base station device, it is impossible to concurrently transmit the resource of ACK/NAC and the resource of the message M3. The transmission of uplink data precedes the transmission of downlink data which has enough resources compared to uplink data and is re-transmittable. In this case, the mobile station device does not transmit ACK/NACK to the base station device.

According to another method, the ACK is transmitted in the case of a successful result of the cyclic redundancy checking (CRC) on downlink data, while the message M3 is transmitted to the base station device only in the case of a failed result of the cyclic redundancy checking (CRC) on downlink data. The mobile station device exploits the next chance (or retransmission timing) to transmit the message M3. The base station device performs efficient communication in such a way that retransmission is performed upon detection of transmission of NACK for downlink data while retransmission becomes needless upon detection of ACK.

Figure 6:
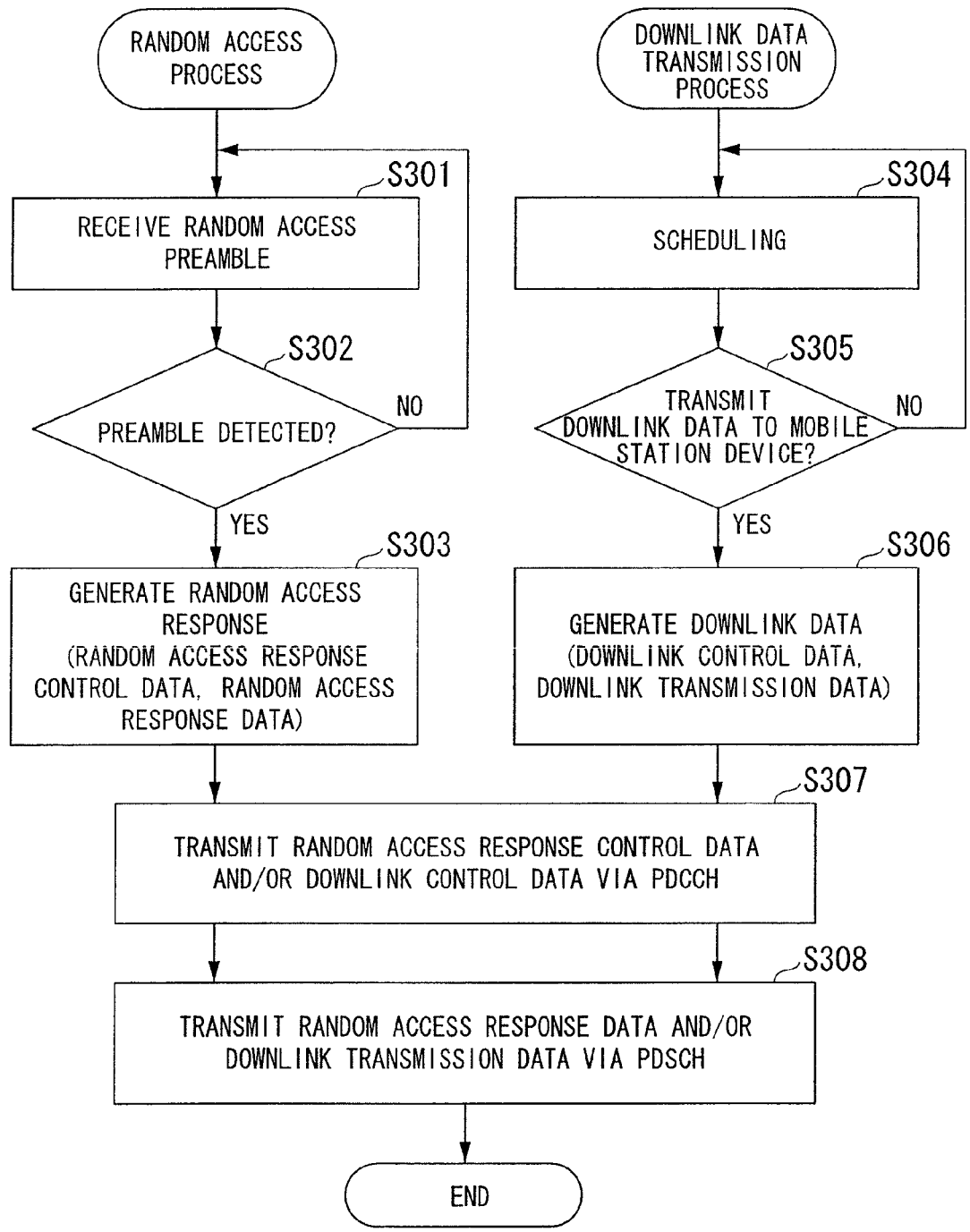
FIG. 6 is a flowchart showing the processing of the base station device 10 according to the embodiment of the present invention.

FIG. 6 is a flowchart showing a processing of the base station device 10 according to the embodiment of the present invention.

FIG. 6 concretely shows the processing of the base station device 10 shown in FIG. 5. Upon reception and detection of the preamble from the mobile station device in the random access (steps S301, S302), the base station device generates the random access response control data and random access response data used for the random access response (step S303). It sets the random access response control data to the downlink control channel (PDCCH) (step S307) while setting the random access response data to the downlink shared channel (PDSCH) (step S308), thus transmitting them to the mobile station device.

The base station device transmits downlink data to the mobile station device in parallel with the execution of the random access process. The base station device performs scheduling to the mobile station device (step S304) so as to determine which mobile station the downlink data should be transmitted to (step S305).

It generates downlink control data and downlink transmission data used for transmission of downlink data. It sets the downlink control data to the downlink control channel (PDCCH) (step S307) while setting the downlink transmission data to the downlink shared channel (PDSCH) (step S308), thus transmitting them to the mobile station device.

Since the base station device cannot be notified of which mobile station device made a random access, the downlink data and the random access response may be concurrently assigned to the mobile station device.

The base station device may transmit the uplink grant and the random access response in parallel. That is, the uplink grant and the random access response may be concurrently assigned to the mobile station device.

Figure 7:
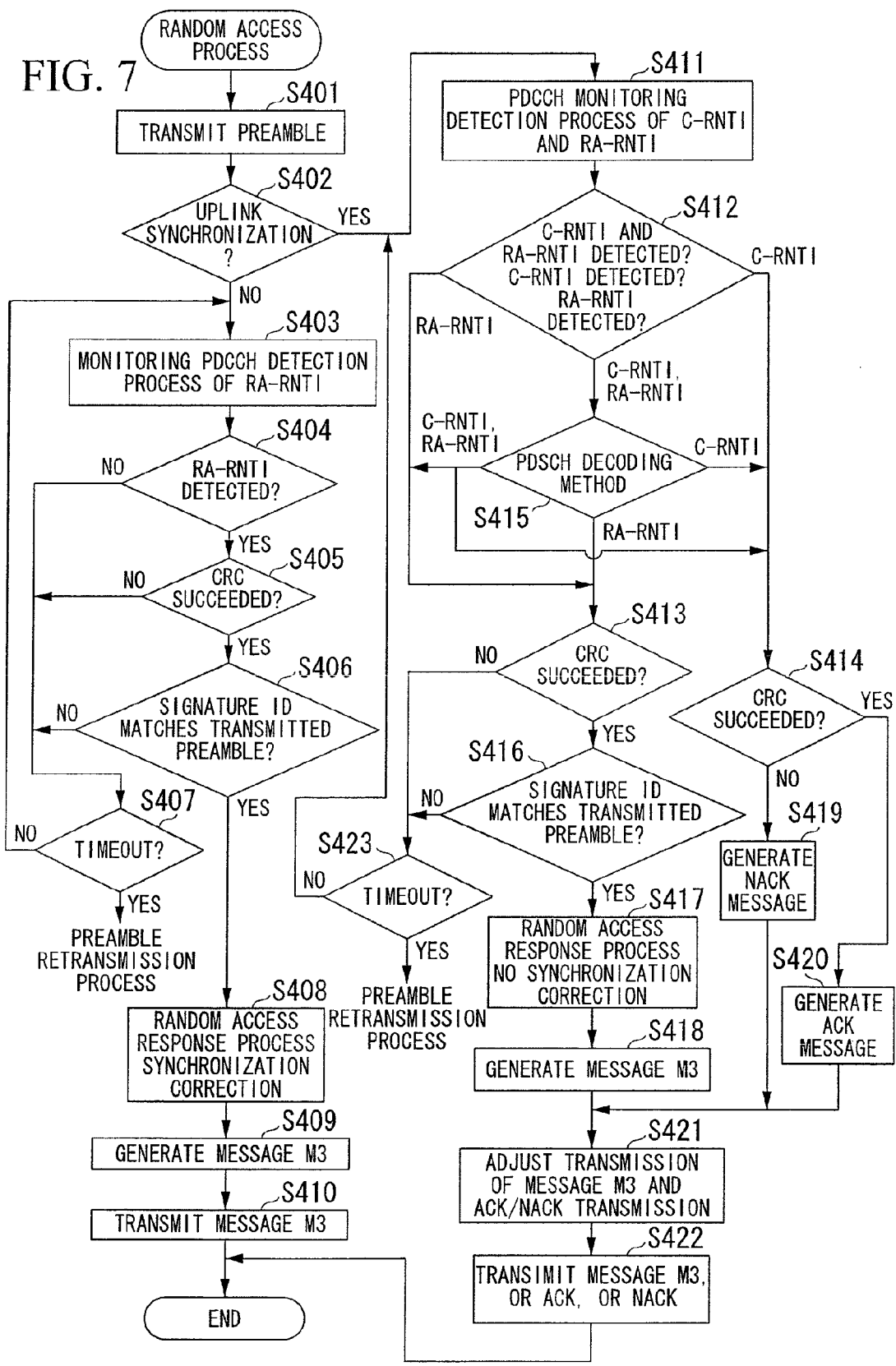
FIG. 7 is a flowchart showing the processing of the mobile station device 50 according to the embodiment of the present invention.

FIG. 7 is a flowchart showing a processing of the mobile station device 50 according to the embodiment of the present invention.

FIG. 7 concretely shows the processing of the mobile station device 50 shown in FIG. 5. After completion of transmission of the preamble in the asynchronous random access (step S401), the mobile station device monitors the downlink to receive the random access response message from the base station device. First, the mobile station device makes a decision as to whether or not it transmits the preamble in the uplink synchronous state (step S402). In the present embodiment this indicates whether or not the mobile station device in the uplink synchronous status transmits the preamble for the purpose of the uplink resource request.

When it is determined that it is not in the uplink synchronous state, the mobile station device monitors the RA-RNTI (steps S403, S404). When the RA-RNTI is not detected in a certain period of time or when the detected RA-RNTI does not include the preamble ID number (or random ID) previously transmitted by itself, a timeout is declared (step S407) so that the mobile station device repeats random access again.

Upon detection of the RA-RNTI in step S404, the mobile station device performs cyclic redundancy checking (CRC) on the downlink shared channel (PDSCH) of the resource block which is assigned and designated by the RA-RNTI, thus performing success/failure determination on the cyclic redundancy checking (CRC). In the case of a failure determination of the cyclic redundancy checking (CRC), the mobile station device repeats monitoring on the RA-RNTI again (steps S403, S404).

In the case of a success determination of the cyclic redundancy checking (CRC), the mobile station device makes a decision as to whether or not the same preamble ID number of the preamble previously transmitted by itself in step S401 is included in the downlink shared channel (PDSCH) which successfully passes the cyclic redundancy checking (CRC) (step S406).

When the same preamble ID number of the preamble previously transmitted by itself is included, the mobile station device acquires and processes the random access response message from the downlink shared channel (PDSCH)

together with the preamble ID number (step S408). That is, the uplink synchronization is corrected based on the synchronization timing deviation information (step S408); the L2/L3 message serving as the message M3 is generated (step S409); and then, the message M3 is transmitted to the base station device (step S410).

When the same preamble ID number of the preamble previously transmitted by itself is not included, the mobile station device monitors the RA-RNTI (steps S403, S404).

Upon the determination in step S402 that the mobile station device makes a random access with the uplink synchronization by way of transmission of the preamble in step S401, the mobile station device monitors the C-RNTI and the RA-RNTI (step S411). When the RA-RNTI is not detected in a certain period of time or when the detected RA-RNTI does not include the preamble ID number (or random ID) previously transmitted by itself, a timeout is declared (step S423) so that the mobile station device repeats the random access again (step S401).

Upon detecting one of the C-RNTI and the RA-RNTI in the downlink control channel (PDCCH), the mobile station device further verifies whether the other is designated for the downlink control channel (PDCCH) (step S412).

Upon detection of the C-RNTI in step S412, the mobile station device performs demodulation on the downlink shared channel (PDSCH) in the resource block which is assigned by the detected C-RNTI. Then, it performs cyclic redundancy checking (CRC) on the downlink shared channel (PDSCH), thus performing success/failure determination (step S414). In the case of a success determination, an ACK for HARQ is generated (step S420) and is then transmitted to the base station device (step S422), while in the case of a failure determination, a NACK for HARQ is generated (step S419) and is then transmitted to the base station device (step S422).

Upon detection of the RA-RNTI in step S412, the mobile station device performs demodulation on the downlink shared channel (PDSCH) in the resource block which is assigned by the RA-RNTI. Then, it performs cyclic redundancy checking (CRC) on the downlink shared channel (PDSCH), thus performing success/failure determination on the cyclic redundancy checking (CRC) (step S413). Upon a failure determination on the cyclic redundancy checking (CRC), the mobile station device repeats monitoring on the RA-RNTI again (step S411).

Upon a success determination on the cyclic redundancy checking (CRC), the mobile station device makes a decision as to whether or not the same preamble ID number of the preamble previously transmitted by itself is included in the downlink shared channel (PDSCH) (step S416).

Upon the determination in step S416 that the same preamble ID number previously transmitted by itself is included, the mobile station device acquires and processes the random access response message from the downlink shared channel (PDSCH) together with the preamble ID number (step S417). Herein, the uplink synchronization is not corrected based on the synchronization timing deviation information (step S417); the L2/L3 message serving as the message M3 is generated (step 418); and then, it is transmitted to the base station device (step S422).

Upon the determination in step 5416 that the same preamble ID number previously transmitted by itself is not included, the mobile station device monitors the R.A-RNTI (step S411).

Upon detection of the C-RNTI and the RA-RNTI in the downlink control channel (PDCCH) of the same sub-frame, the mobile station device performs demodulation on the downlink shared channel (PDSCH) in the resource block designated by the C-RNTI while performing demodulation on the downlink shared channel (PDSCH) in the resource block designated by the RA-RNTI (step S415). This achieves an uninterrupted execution on the downlink data reception and uplink resource request. In this case, it performs the process regarding the detected C-RNTI and the process regarding the detected RA-RNTI in parallel.

According to another method adapted to the mobile station device which does not have the capability of demodulating two downlink shared channels (PDSCH), it may perform demodulation on only the downlink shared channel (PDSCH) in the resource block designated by the RA-RNTI or only the downlink shared channel (PDSCH) in the resource block designated by the C-RNTI. This may diminish the packaging complexity of the mobile station device. When the prescribed capability is predetermined for the mobile station device or when the capability of the mobile station device is predetermined by specifications, it is possible to directly make a determination whether to demodulate only the downlink shared channel (PDSCH) in the resource block designated by the RA-RNTI, determination whether to demodulate only the downlink shared channel (PDSCH) in the resource block designated by the C-RNTI, or determination whether to demodulate both of them without problem; hence, it is possible to omit step S415 in the drawing.

When the transmission timing of the ACK/NACK for downlink data scheduled by the C-RNTI overlaps with the transmission timing of the message M3 designated by the random access response, the mobile station device is rectified not to transmit the ACK/NACK (step S421). For the purpose of uplink single-carrier transmission, the mobile station device cannot concurrently transmit the resource of the ACK/NACK and the resource of the message M3 to the base station device. To process in parallel in uplink synchronization, the condition of the transmission timings overlapping with each other occurs without depending upon data being detected in the downlink control channel (PDCCH).

The transmission of uplink transmission precedes the transmission of downlink data which has enough resources compared to uplink data and is re-transmittable. In this case, the mobile station device does not transmit the ACK/NACK.

According to a further method, it transmits the ACK in the case of a success determination on the cyclic redundancy checking (CRC) of downlink data while transmitting the message M3 to the base station device in the case of a failure determination on the cyclic redundancy checking (CRC) of downlink data. The mobile station device transmits the message M3 at the next chance (or retransmission timing). It is possible to perform highly efficient communication since the base station device performs retransmission when the ACK for downlink data is not transmitted thereto while it does not necessarily perform retransmission upon detection of the ACK.

According to the above embodiment of the present invention, when the transmission unit 62 of the mobile station device 50 in the uplink synchronous status transmits the preamble to the base station device 10 via the random access channel, the mobile station device 10 monitors the downlink control channel (PDCCH) while verifying both of the C-RNTI for designating an uplink grant or downlink control data transmitted by the base station device 10 and the RA-RNTI for designating random access response control data; hence, it is possible to perform the random access processing between the mobile station device 50 and the base station device 10 without interrupting communication between the mobile station device 50 and the base station device 10, and thus it is possible to perform highly efficient communication between the mobile station device 50 and the base station device 10.

According to a variation of the embodiment of the present invention, only the downlink control channel (PDCCH) is subjected to monitoring with verification on only the RA-RNTI for designating random access response control data during a random access involved in the uplink synchronous status, wherein a method for continuing the uplink synchronous status will be described below.

Figure 8:
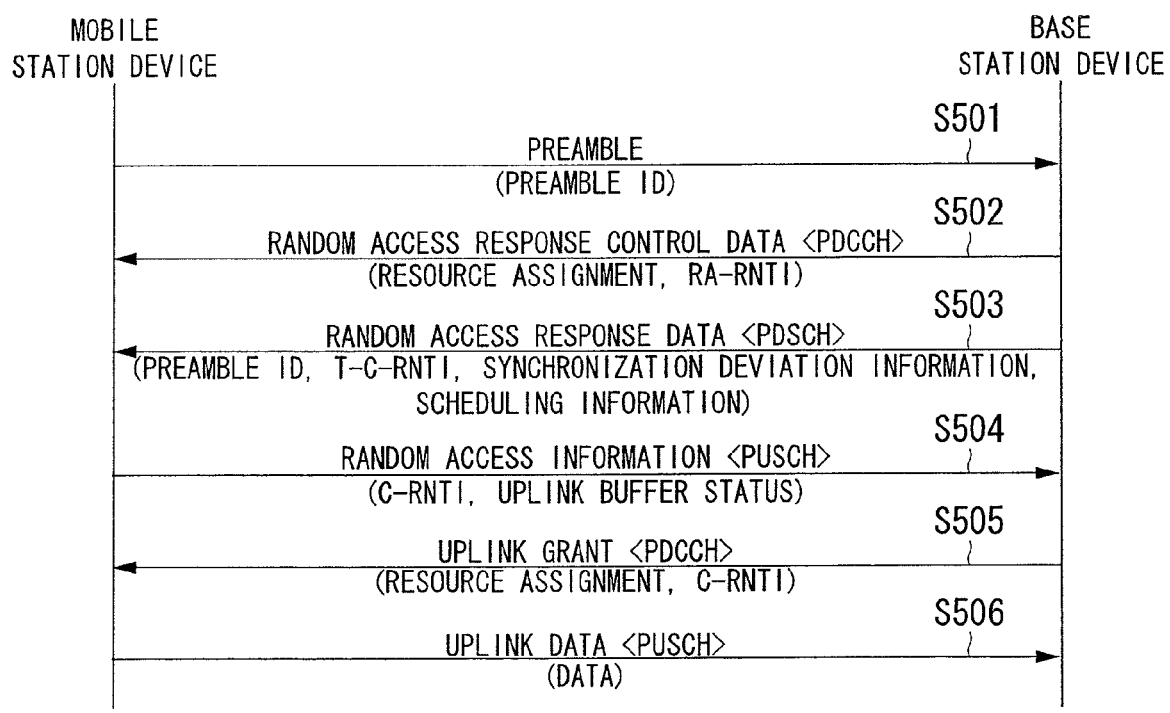
FIG. 8 is a sequence diagram showing the processing of a radio communication system according to a variation of the embodiment of the present invention.

FIG. 8 is a sequence diagram showing a processing of the radio communication system according to a variation of the embodiment of the present invention. The sequence diagram of FIG. 8 shows the processing regarding an uplink resource request by way of a contended random access. This shows the processing issuing the uplink resource request due to the occurrence of data to be transmitted in the mobile station device in the uplink synchronous status. The mobile station device transmits the preamble, whose preamble ID number is randomly selected from among preamble IDs available for the contended random access, to the base station device (step S501).

The base station device detects the above preamble transmitted by the mobile station device. Herein, the preamble is a signal pattern suited to the preamble ID number, wherein the base station device detects the preamble upon detection of the reception signal matching the signal pattern of the preamble ID number.

The random access response transmitted from the base station device to the mobile station device, which is illustrated in step S02 of FIG. 11, is constituted of the random access response control data transmitted via the downlink control channel (PDCCH) (step S502) and the random access response data transmitted via the downlink shared channel (PDSCH) (step S503).

The base station device transmits the random access response control data including the RA-RNTI and the resource assignment information to the mobile station device via the downlink control channel (PDCCH) (step S502), thus designating the resource block (PDSCH) for allocating the random access response data.

In addition, the base station device transmits the random access response data in the resource block designated by the random access response control data (step S503).

The mobile station device transmitting the preamble to the base station device receives the random access response control data and the random access response data from the base station device (steps S502, S503). The mobile station device receives—the random access response message for the preamble previously transmitted by itself by way of acquisition of the message whose preamble ID number which is included in the random access response data matches the preamble ID number of the preamble previously transmitted by itself. The mobile station device discards the synchronization timing deviation information included in the random access response message, thus not performing the uplink timing alignment (uplink synchronization process) and not performing the reset of the timer by use of the synchronization timing deviation information included in the random access response message. This prevents inconsistency occurring between the base station device and the mobile station device in terms of the uplink synchronous/asynchronous status. It is unadvisable to perform the timing alignment in the case of the contended random access since no confirmation is secured as to whether the detected synchronization timing deviation information derives from the preamble previously transmitted by itself. Since the reset of the timer causes inconsistency occurring between the base station device and the mobile station device with respect to the synchronization sustainable time; hence, it is advisable to maintain the present operation of the timer. The base station device and the mobile station device are supposed to maintain the previous uplink synchronous/asynchronous status prior to the random access. This eliminates the necessity of needlessly executing the error recovery process.

The mobile station device transmits the L2/L3 message including the C-RNTI (random access information) to the base station device (message M3) in the resource designated by the scheduling information included in the random access response message (step S504). The random access information includes the information representative of the uplink resource request and the uplink buffer status representative of the amount of uplink data stored in the uplink buffer.

The base station device transmits the uplink grant suited to the uplink resource request to the mobile station device via the downlink control channel (PDCCH) (step S505). The mobile station device receiving the uplink grant transmits uplink data to the base station device via the uplink shared channel (PUSCH) (step S506).

In the aforementioned embodiment, programs implementing the functions of the base station device 10 (FIG. 1) including the data control unit 11, the OFDM modulation unit 12, the scheduling unit 13, the channel estimation unit 14, the DFT-S-OFDM (DFT-Spread-OFDM) demodulation unit 15, the control data extraction unit 16, the preamble detection unit 17, and the radio unit 18 as well as the functions of the mobile station device 50 (FIG. 2) including the data control unit 51, the DFT-S-OFDM modulation unit 52, the scheduling unit 53, the OFDM demodulation unit 54, the channel estimation unit 55, the control data extraction unit 56, the synchronization correction unit 57, the preamble generation unit 58, the preamble selection unit 59, and the radio unit 60 are stored in computer-readable storage media, so that programs stored in storage media are loaded into and run by a computer system, thus controlling the base station device 10 and the mobile station device 50. Herein, the term "computer system" may embrace hardware such as the OS and peripheral devices.

The term "computer-readable storage media" refers to portable media such as flexible disks, magneto-optical disks, ROM, and CD-ROMs as well as storage devices such as hard-disk units built in computer systems. In addition, the term "computer-readable storage media" may embrace media for temporarily and dynamically retaining programs, e.g. communication lines for transmitting programs, such as networks, the Internet, and telephone lines as well as media for retaining programs in prescribed periods, such as internal volatile memories of computer systems serving as servers and clients. The aforementioned programs may achieve a part of the aforementioned functions, or they are combined with pre-installed programs of computer systems so as to achieve the aforementioned functions.

As described above, the radio communication system according to one embodiment of the present invention is a radio communication system including a base station device and a mobile station device, wherein the mobile station device includes a preamble transmission unit which transmits a random access preamble to the base station device, a downlink control channel reception unit which receives a downlink control channel, and a determination unit which makes a determination as to whether or not the downlink control channel includes response control data, which the base station device transmits in response to the random access preamble transmitted by the preamble transmission unit and makes a determination as to whether or not the downlink control channel includes an uplink grant or downlink control data destined thereto, and wherein the base station device includes a preamble reception unit which receives the random access preamble from the mobile station device, a downlink control channel transmission unit which transmits the downlink control channel, a response control data transmission unit which transmits response control data via the downlink control channel when the preamble reception unit receives the random access preamble, and a downlink control data transmission unit which transmits downlink control data including a downlink resource assignment via the downlink-control channel.

The mobile station device according to one embodiment of the present station device and which includes a preamble transmission unit which transmits a random access preamble to the base station device, a downlink control channel reception unit which receives a downlink control channel, and a determination unit which makes a determination as to whether or not the downlink control channel includes response control data, which the base station device transmits in response to the random access preamble transmitted by the preamble transmission unit, and makes a determination as to whether or not the downlink control channel includes an uplink grant or downlink control data destined thereto.

A program according to one embodiment of the present invention causes a computer of a mobile station device performing radio communication with a base station device to serve as a preamble transmission unit for transmitting a random access preamble to the base station device, a downlink control channel reception unit for receiving a downlink control channel, and a determination unit for making a determination as to whether or not the downlink control channel includes response control data, which the base station device transmits in response to the random access preamble transmitted by the preamble transmission unit, and for making a determination as to whether or not the downlink control channel includes an uplink grant or downlink control data destined thereto.

A radio communication method according to one embodiment of the present invention is a radio communication method using a base station device and a mobile station device, wherein the mobile station device implements a preamble transmission process which transmits a random access preamble to the base station device, a downlink control channel reception process which receives a downlink control channel, and a determination process which makes a determination as to whether or not the downlink control channel includes response control data, which the base station device transmits in response to the random access preamble transmitted in the preamble transmission process, and makes a determination as to whether or not the downlink control channel includes an uplink grant or downlink control data destined thereto, and wherein the base station device implements a preamble reception process which receives the random access preamble from the mobile station device, a downlink control channel transmission process which transmits the downlink control channel, a response control data transmission process which transmits response control data including an assignment of an uplink resource, which is not assigned to another mobile station device, to the mobile station device upon reception of an uplink resource request in a resource request reception process, a response control data transmission process which transmits the response control data via the downlink control channel upon reception of the random access preamble in the preamble reception process, and a downlink control data transmission process which transmits the downlink control data including a downlink resource assignment via the downlink control channel.

The embodiment of this invention is described in detail with reference to the drawings, wherein the detailed constitution is not necessarily limited to the embodiment so that the claims may embrace designs whose scopes do no depart from the scope of the invention.

INDUSTRIAL APPLICABILITY

Communication systems performing highly efficient communications between mobile station devices and base station devices.

The invention claimed is:
1. A radio communication system comprising:
a mobile station device configured to transmit, to a base station device, a random access preamble,
wherein the mobile station device is further configured to receive, from the base station device, a random access response to the random access preamble, the received random access response including timing deviation information, and
wherein the mobile station device is further configured to ignore the timing deviation information, in case that, in an uplink synchronous status, the timing deviation information included in the random access response corresponds to the random access preamble whose preamble identification (ID) is randomly selected by the mobile station device, wherein the timing deviation information does not include a Null value or an indication to ignore the timing deviation information; and to perform uplink timing alignment based on the timing deviation information, in case that, in an uplink asynchronous status, the timing deviation information included in the random access response corresponds to the random access preamble whose preamble identification (ID) is randomly selected by the mobile station device.
2. The radio communication system according to claim 1, wherein the uplink synchronous status is managed by a timer so that the uplink synchronous status is sustained until the timer expires.
3. A mobile station device comprising:
circuitry configured to transmit a random access preamble;
circuitry configured to receive, from a base station device, a random access response to the random access preamble; and
circuitry configured to ignore timing deviation information, in case that, in an uplink synchronous status, the timing deviation information is included in the random access response and corresponds to the random access preamble whose preamble identification (ID) is randomly selected by the mobile station device, wherein the timing deviation information does not include a Null value or an indication to ignore the timing deviation information; and to perform uplink timing alignment based on timing deviation information, in case that, in an uplink asynchronous status, the timing deviation information is included in the random access response and corresponds to the random access preamble whose preamble identification (ID) is randomly selected by the mobile station device.
4. The mobile station device according to claim 3, wherein the uplink synchronous status is managed by a timer so that the uplink synchronous status is sustained until the timer expires.

5. A radio communication system comprising:

a mobile station device configured to receive, from a base station device, timing deviation information, wherein the mobile station device is further configured to ignore the timing deviation information which is included in a random access response and corresponds to a random access preamble whose preamble identification (ID) is randomly selected by the mobile station device, while a timer which starts timekeeping after receiving the timing deviation information is running, wherein the timing deviation information does not include a Null value or an indication to ignore the timing deviation information; and to perform uplink timing alignment based on the timing deviation information which is included in the random access response and corresponds to the random access preamble whose preamble identification (ID) is randomly selected by the mobile station device, while the timer is not running.

6. A mobile station device comprising:

circuitry configured to transmit a random access preamble to a base station device;

circuitry configured to receive, from the base station device, a random access response to the random access preamble; and circuitry configured to ignore timing deviation information which is included in the random access response and corresponds to the random access preamble whose preamble identification (ID) is randomly selected by the mobile station device, while a timer which starts timekeeping after receiving the timing deviation information is running, wherein the timing deviation information does not include a Null value or an indication to ignore the timing deviation information; and to perform uplink timing alignment based on timing deviation information which is included in the random access response and corresponds to the random access preamble whose preamble identification (ID) is randomly selected by the mobile station device, while the timer is not running.

7. A processing method of a mobile station device, the processing method comprising:

transmitting a random access preamble to a base station device;

receiving, from the base station device, a random access response to the transmitted random access preamble;

ignoring timing deviation information, in case that, in an uplink synchronous status, the timing deviation information is included in the random access response and corresponds to the random access preamble whose preamble identification (ID) is randomly selected by the mobile station device, wherein timing deviation information does not include a Null value or an indication to ignore the timing deviation information; and performing uplink timing alignment based on timing deviation information, in case that, in an uplink asynchronous status, the timing deviation information is included in the random access response and corresponds to the random access preamble whose preamble identification (ID) is randomly selected by the mobile station device.

8. A processing method of a mobile station device, the processing method comprising:

transmitting a random access preamble to a base station device;

receiving, from the base station device, a random access response to the random access preamble;

ignoring timing deviation information which is included in the random access response and corresponds to the random access preamble whose preamble identification (ID) is randomly selected by the mobile station device, while a timer which starts timekeeping after receiving the timing deviation information is running, wherein the timing deviation information does not include a Null value or an indication to ignore the timing deviation information; and performing uplink timing alignment based on timing deviation information which is included in the random access response and corresponds to the random access preamble whose preamble identification (ID) is randomly selected by the mobile station device, while the timer is not running.

* * * * *